(12) United States Patent
Ueta et al.

(10) Patent No.: US 8,058,328 B2
(45) Date of Patent: *Nov. 15, 2011

(54) CEMENT ADMIXTURE

(75) Inventors: Tomiyasu Ueta, Osaka (JP); Hiroshi Yamazaki, Osaka (JP); Hiromichi Tanaka, Kanagawa (JP)

(73) Assignee: Nippon Shokubai Co., Ltd., Osaka-Shi, Osaka (JP)

( * ) Notice: Subject to any disclaimer, the term of this patent is extended or adjusted under 35 U.S.C. 154(b) by 1212 days.

This patent is subject to a terminal disclaimer.

(21) Appl. No.: 10/578,574

(22) PCT Filed: Nov. 4, 2004

(86) PCT No.: PCT/JP2004/016704
§ 371 (c)(1),
(2), (4) Date: Feb. 12, 2007

(87) PCT Pub. No.: WO2005/044752
PCT Pub. Date: May 19, 2005

(65) Prior Publication Data
US 2007/0142505 A1 Jun. 21, 2007

(30) Foreign Application Priority Data

Nov. 5, 2003 (JP) .................. 2003-376183
Jun. 4, 2004 (JP) .................. 2004-167295
Jun. 24, 2004 (JP) .................. 2004-186452

(51) Int. Cl.
- C08K 3/00 (2006.01)
- C08K 3/04 (2006.01)
- C08K 5/09 (2006.01)
- C08K 5/092 (2006.01)
- C08K 5/11 (2006.01)

(52) U.S. Cl. ............... 524/5; 524/2; 524/200; 524/4; 524/376; 524/377; 525/223; 526/318.42

(58) Field of Classification Search ............ 524/2, 200, 524/4, 5, 376, 377; 525/223; 526/318.42
See application file for complete search history.

(56) References Cited

U.S. PATENT DOCUMENTS

| | | | |
|---|---|---|---|
| 5,925,184 A | 7/1999 | Hirata et al. | |
| 6,239,241 B1 | 5/2001 | Yamato et al. | |
| 6,258,162 B1 | 7/2001 | Kawakami et al. | |
| 6,388,038 B1 | 5/2002 | Hirata et al. | |
| 6,462,110 B2 | 10/2002 | Satoh et al. | |
| 2003/0199616 A1* | 10/2003 | Yamashita et al. | 524/2 |
| 2004/0107876 A1* | 6/2004 | Tomita et al. | 106/808 |

FOREIGN PATENT DOCUMENTS

| | | |
|---|---|---|
| CA | 2091310 | 9/1993 |
| CN | 1252394 | 5/2000 |
| EP | 0560602 | 9/1993 |
| JP | 6-048801 | 2/1994 |
| JP | 9-248438 A | 9/1997 |
| JP | 9-286647 A | 11/1997 |
| JP | 11-157897 A | 6/1999 |
| JP | 2000-191357 A | 7/2000 |
| JP | 2001-172068 A | 6/2001 |
| JP | 2001-180998 A | 7/2001 |
| JP | 2002-187755 | 7/2002 |
| JP | 2003-12358 A | 1/2003 |
| JP | 2003-128594 | 5/2003 |
| TW | 419447 B | 2/1986 |
| WO | WO 02/096823 * | 12/2002 |
| WO | WO 03/066542 | 8/2003 |
| WO | WO-2004/099100 A1 | 11/2004 |
| WO | WO 2004099100 * | 11/2004 |

OTHER PUBLICATIONS

Examiner's Search Report on TW93133563.

* cited by examiner

*Primary Examiner* — James J Seidleck
*Assistant Examiner* — Deve E Valdez
(74) *Attorney, Agent, or Firm* — Connolly Bove Lodge & Hutz LLP

(57) ABSTRACT

A cement admixture object of the present invention can make slump-retaining ability excellent to retain fluidity and, at the same time, can realize a viscosity of cement compositions so that work becomes easy at a field handling them, can make the state of a cement composition better. The present invention relates to a cement admixture which comprises a polycarboxylic acid copolymer having a polyalkylene glycol side chain, said polycarboxylic acid copolymer being constituted of two or more species of copolymers with different acid values, and at least one of said two or more species of copolymers with different acid values having an oxyalkylene group containing 3 or more carbon atoms.

22 Claims, No Drawings ic acid copolymers having different acid values (acid numbers) and/or (2) the copolymer consisting of two or more species of copolymers having a specified weight average molecular weight as the polycarboxylic acid copolymer comprised in a cement admixture, a cement admixture having excellent

CEMENT ADMIXTURE

This application is a National Stage of PCT/JP2004/016704 filed Nov. 4, 2004 which in turn claims priority from Japanese Applications 2003-376183 filed Nov. 5, 2003; 2004-167295 filed Jun. 4, 2004; and 2004-186452, filed Jun. 24, 2004, respectively.

TECHNICAL FIELD

The present invention relates to a cement admixture. More particularly, the present invention relates to a cement admixture which can exert high water-reducing performance and is easily handled, therefore, can be suitably used for cement compositions such as cement paste, mortar and concrete.

BACKGROUND ART

A cement admixture is widely used as a water-reducing agent for cement compositions such as cement paste, mortar and concrete, and has become essential in constructing civil engineering and building structures and the like from cement compositions. Such concrete admixtures increase the fluidity of cement compositions to thereby reduce the water requirement of the cement compositions, and therefore are effective in improving the strength, durability and the like, of hardened (cured) products. Among such water reducing agents, polycarboxylic acid concrete admixtures comprising a polycarboxylic acid copolymer exhibit superior water-reducing performance to naphthalene and other conventional water reducing agents, thus have already led to good results in many cases as high performance AE (air-entraining) and high-range water-reducing admixture.

Such cement admixtures are required to be able not only to show water-reducing performance in such cement compositions but also to improve cement compositions in viscosity to thereby facilitate the works at the sites of handling them. Thus, the cement admixture used as a water-reducing agent are required at the sites of civil engineering and building structure construction and the like not only to be able to show water-reducing performance by decrease in a viscosity of cement compositions but also to provide a viscosity in such the level that the works will be facilitated at the sites of handling them. If a cement admixture can exhibit such performance characteristics, it will improve the working efficiency in civil engineering and building structure construction and the like.

Meanwhile, regarding a dispersant for an inorganic powder, Japanese Kokai Publication Hei-9-248438 (page 2) discloses the dispersant containing a water-soluble co-condensate or a water-soluble polymer in which a random polymerization chain (A) of an oxypropylene group and/or an oxybutylene group and an oxyethylene group is introduced. However, when it is used in cement compositions as an essential components, there was a room for contrivance in order to further improve the working efficiency in a field of the sites of civil engineering and building structure construction and the like, by improving the retaining ability of fluidity of concrete at a manufacturing filed or at the sites of handling them and, at the same time, by improving the condition of concrete so that the workability of concrete becomes excellent.

In addition, Japanese Patent Application 2003-128594 proposes a cement admixture which improves water-reducing property of cement compositions to make a strength and durability of its hardening product excellent, and can realize such a viscosity that work is easy in a field handling them, by introducing an alkylene oxide part having 3 or more carbon atoms into an intermediate part which is a particular part of a polyethylene glycol chain of a polycarboxylic acid copolymer having a polyethylene glycol chain. However, in such the cement admixture, since hydrophobicity of a cement admixture is too strong, an adsorbing force onto cement is weakened and, in order to enhance a cement dispersing ability, an amount of a cement admixture to be added is relatively large, and there remains a problem that economical disadvantage is caused.

SUMMARY OF THE INVENTION

The present invention has been made in view of the above-mentioned state of the art and it is an object of the present invention to provide a cement admixture which can make slump-retaining ability excellent to retain fluidity and, at the same time, can realize a viscosity of cement compositions so that work becomes easy at a field handling them, can make the state of a cement composition better and, moreover, can reduce an amount of a cement admixture to be added.

The present inventors made investigations of a cement admixture retaining fluidity and having excellent workability required in a field of constructing a civil engineering or construction structure, they paid attention to the fact that a cement admixture comprising a polycarboxylic acid copolymer having polyalkylene glycol as a side chain can exhibit excellent water-reducing ability in a cement composition. And they found that, by adopting a polyalkylene glycol chain comprising an oxyalkylene group having 3 or more carbon in such the polycarboxylic acid copolymer, it becomes possible to reduce a viscosity of a cement composition and the like and, by using (1) the copolymer consisting of two or more species of copolymers having different acid values (acid numbers) and/or (2) the copolymer consisting of two or more species of copolymers having a specified weight average molecular weight as the polycarboxylic acid copolymer comprised in a cement admixture, a cement admixture having excellent properties of respective copolymers can be obtained and the state of a cement composition such as a concrete which contains the cement admixture becomes better, and slump-retaining ability can be excellent. Thus, they have come to a conclusion that the above-mentioned problems can be solved, which resulted in completion of the present invention. For example, the present inventors found out that dispersing ability of a cement composition can be improved resulting from a copolymer having larger acid values, slump-retaining ability of a cement composition and the like can be more improved resulting from a copolymer having smaller acid values, and these action effects are combined, thus, a cement composition can be brought into the state where the work is easy. In addition, since bringing a cement admixture in such the state can make dispersing ability of a cement composition can be improved, it becomes possible to reduce an amount of the cement admixture to be added and improve a compression strength of a hardening product obtained from a cement composition and the like.

Further, the present inventors made investigations of a cement admixture excellent in water-reducing ability, workability and an addition amount, and they found that a polycarboxylic acid copolymer having both of the sites having a polyalkylene glycol chain having 2 to 18 carbon atoms and 0.01 to 49 mole % of which has a polyalkylene glycol chain having 3 to 18 carbon atoms, and a site having a polyethylene glycol chain is effective in improving workability of a cement composition and reducing in an amount to be added at the same time, which resulted in completion of the present invention.

That is, the present invention is a cement admixture which comprises a polycarboxylic acid copolymer having a polyalkylene glycol side chain, said polycarboxylic acid copolymer being constituted of two or more species of copolymers with different acid values, and at least one of said two or more species of copolymers with different acid values having an oxyalkylene group containing 3 or more carbon atoms.

The present invention is also a cement admixture which comprises a polycarboxylic acid copolymer having a polyalkylene glycol side chain containing an oxyalkylene group having 3 or more carbon atoms, said polycarboxylic acid copolymer being constituted of two or more species of copolymers with a weight average molecular weight of 20000 or less.

The present invention is further a cement admixture comprising a polycarboxylic acid copolymer, wherein the polycarboxylic acid copolymer has the site represented by the following formula (1);

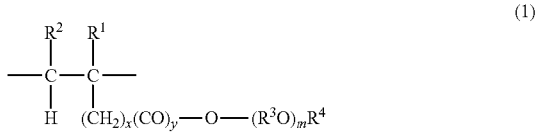
(1)

in the formula, $R^1$ and $R^2$ may be the same or different and each represents a hydrogen atom or a methyl group; x represents a number of 0 to 2; y represents 0 or 1; $R^3$Os may be the same or different and each represents an oxyalkylene group having 2 to 18 carbon atoms, and 0.01 to 49 mole % of an average molar number of addition of the oxyalkylene group is an oxyalkylene group having 3 to 18 carbon atoms; $R^4$ represents a hydrogen atom or a hydrocarbon group having 1 to 30 carbon atoms; and m is an average molar number of addition of the oxyalkylene group, and represents a number of 3 to 300, and a site represented by the following formula (2);

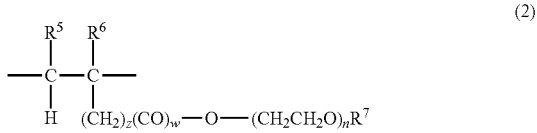
(2)

in the formula, $R^5$ and $R^6$ may be the same or different and each represents a hydrogen atom or a methyl group; z represents a number of 0 to 2; w represents 0 or 1; $R^7$ represents a hydrogen atom or a hydrocarbon group having 1 to 30 carbon atoms; and n is an average molar number of addition of an oxyethylene group, and represents a number of 1 to 300.

DETAILED DISCLOSURE OF THE INVENTION

The present invention will be described in detail below.

The cement admixture of the present invention comprises a polycarboxylic acid copolymer having a polyalkylene glycol side chain containing an essential oxyalkylene group having 3 or more carbon atoms.

The polycarboxylic acid copolymer contains (1) an embodiment of the copolymer constituted of two or more species of copolymers having different acid values and/or (2) an embodiment of the copolymer constituted of two or more species of copolymers with a weight average molecular weight of 20000 or smaller. The copolymer constituted of two or more species of copolymers is a copolymer containing two or more species of copolymers, each of which is assessed as one copolymer by having a particular nature.

Incidentally, "a polycarboxylic acid copolymer" means a copolymer suitable for using as a cement admixture, and comprising a polycarboxylic acid or an analogous compound thereof such as the polymer described in this description, for example a derivative or a polycarboxylic acid salt.

It is preferable that the copolymer is obtained by polymerizing a monomer component containing a polyalkylene glycol unsaturated monomer. More preferably, a monomer component contains an unsaturated carboxylic acid monomer. If necessary, other copolymerizable monomer may be contained. When a copolymer is obtained by polymerizing such the monomer component, examples of an embodiment of two or more species of copolymers include (A) an embodiment in which a structure of a polyalkylene glycol chain containing an essential oxyalkylene group having 3 or more carbon atoms is different, (B) an embodiment in which a kind and a use amount of each monomer in a monomer component are different, (C) an embodiment in which a molecular weight of a copolymer obtained by polymerization is different, and (D) a combination of these embodiments. Examples of a structure in the case of (A) include an embodiment in which a polyalkylene glycol side chain containing an essential oxyalkylene group having 3 or more carbon atoms is obtained by random polymerization, an embodiment in which the side chain is obtained by block polymerization, and an embodiment in which the side chain is obtained by alternate polymerization. In addition, in the case of (B), examples include an embodiment in which a kind and a use amount of the aforementioned other copolymerizable monomer are different. Such the two or more kind of copolymers can be obtained by preparing separately two or more species of copolymers, and then, mixing those copolymers, or preparing so that two or more species of copolymers are produced.

In the embodiment of (1), when the polycarboxylic acid copolymer is constructed of two or more species of copolymers having different acid values, acid values of these copolymers are different and, when the polycarboxylic acid copolymer is constructed of three or more species of copolymers, an embodiment may be an embodiment in which an acid value of respective copolymers are different, or an embodiment in which at least two species of copolymers having the same acid value are contained. Like this, one of the preferable embodiments of the present invention is a cement admixture comprising a polycarboxylic acid copolymer having a polyalkylene glycol side chain containing an oxyalkylene group having 3 or more carbon atoms, the polycarboxylic acid copolymer being constructed of two or more species of copolymers having different acid values.

It is preferable that the ratio of the acid value of the aforementioned two or more species of copolymers is 1.2 to 5. When the ratio is less than 1.2, or exceeds 5, there is a possibility that dispersity of a cement composition and slump-retaining ability can not be sufficiently improved. A lower limit value is more preferably 1.3, and still more preferably 1.5. An upper limit value is more preferably 4, and still more preferably 3. More preferably, the range is 1.3 to 4, and still more preferably 1.5 to 3.

When the aforementioned copolymers is two species, representing larger acid values as "A" and smaller acid values to as "B", the aforementioned ratio of the acid value is "A/B" and, when the aforementioned copolymers is three species or more, representing the largest acid value among them "C" and the smallest acid value "D", the ratio is "C/D".

Regarding respective acid values of the aforementioned two or more species of copolymers, for a copolymer having the largest acid value, a lower limit value is preferably 10%, more preferably 12%, and still more preferably 15%. An upper limit value is preferably 40%, more preferably 35%, and still more preferably 30%. In addition, a preferable range is 10 to 40%, more preferably 12 to 35%, and still more preferably 15 to 30%. When an acid value is less than 10%, or exceeds 40%, there is a possibility that dispersity of a cement composition is not sufficiently improved.

In a copolymer having the lowest acid value, a lower limit value is preferably 5%, more preferably 7%, and still more preferably 8%. An upper limit value is preferably 30%, more preferably 25%, and still more preferably 20%. In addition, a preferable range is 5 to 30%, more preferably 7 to 25%, and still more preferably 8 to 20%. When the amount is less than 5%, or exceeds 30%, there is a possibility that slump-retaining ability of a cement composition is not sufficiently improved.

The aforementioned acid value means a ratio (%) of a monomer having an acid group and/or a sodium salt form of the acid group completely neutralized by sodium hydroxide in a monomer component. For example, when the copolymer is obtained by polymerizing a monomer component, representing a mixing weight of a monomer having an acid group in the monomer component as "a", and representing a mixing weight of a monomer not having an acid group as "b", an acid value "A" can be obtained by the following equation:

$$\text{Acid value } "A" = 100 \times a/(a+b)$$

For example, in the case where the total monomer component amount is assumed to be 100% by weight (weight %, mass % or % by mass), when the monomer component consists of 75% by weight of a polyalkylene glycol monomer, and 25% by weight of sodium methacrylate having a carboxyl group as an acid group, an acid value is 25%. When the monomer component consists of 60% by weight of a polyalkylene glycol monomer, 30% by weight of sodium methacrylate and 10% by weight of methyl methacrylate, an acid value is 30%.

As the acid group, a carboxyl group, and a sulfonic acid group are suitable examples.

A weight average molecular weight of each of two or more kinds of copolymers in the embodiment of the above (1) is preferably 1000 or larger in terms of polyethylene glycol by GPC. The weight average molecular weight is more preferably 3,000 or larger, still more preferably 5,000 or larger, and particularly preferably 7,000 or larger. And, the weight average molecular weight is preferably 500,000 or smaller, more preferably 300,000 or smaller, still more preferably 100,000 or smaller, and particularly preferably 80,000 or smaller. When the weight average molecular weight is smaller than 1,000, or exceeds 500,000, there is a possibility that dispersity is reduced.

In the embodiment of the above (2), when a weight average molecular weight of at least one kind of two or more kinds of copolymers exceeds 20,000, slump-retaining ability of a cement composition can not be sufficiently improved, and a cement composition can not be brought into the state where work is sufficiently easy. A weight average molecular weight is preferably 19,000 or smaller, more preferably 18,000 or smaller.

The above mentioned weight average molecular weight can be determined by gel permeation chromatography (hereinafter referred to as "GPC") and expressed on the polyethylene glycol equivalent. For example it can be determine by the following measurement conditions.

[GPC Molecular Weight Measurement Conditions]
Column used: Tosoh TSK guard column SWXL+TSK gel G4000SWXL+G3000SWXL+G2000SWXL
Eluent: Sodium acetate trihydrate (115.6 g) is dissolved in a mixed solvent composed of 10999 g of water and 6001 g of acetonitrile, and the solution is further adjusted to pH 6.0 with acetic acid and used as the solution of the eluent.
Injection volume: 100 µL of the 0.5% solution of the eluent
Eluent flow rate: 0.8 mL/min
Column temperature: 40° C.
Standard samples: Polyethylene glycol, peak-top molecular weights (Mp) 272500, 219300, 85000, 46000, 24000, 12600, 4250, 7100, 1470
Order of Calibration curve: 3rd-order
Detector: Waters, Japan's 410 differential refractive index detector
Analysis software: Waters, Japan's MILLENNIUM Ver. 3.21

The cement admixture of the present invention contains a polycarboxylic acid copolymer having a polyalkylene glycol side chain containing an essential oxyalkylene group having 3 or more carbon atoms, and may contain a polymer other than such the copolymer. In the case where the total polymer amount contained in the cement admixture of the present invention is assumed to be 100% by weight, a content of a polycarboxylic acid copolymer having a poylalkylene glycol side chain containing an essential oxyalkylene group having 3 or more carbon atoms is preferably 50% by weight or larger. When the content is less than 50% by weight, there is a possibility that dispersity of a cement composition can not be sufficiently improved. The content is preferably 60% by weight or larger, and still more preferably 70% by weight or larger.

Regarding an acid value of a total polymer contained in the cement admixture, a lower limit value is preferably 20 mgKOH/g, more preferably 40 mgKOH/g, and still more preferably 60 mgKOH/g An upper limit value is preferably 140 mgKOH/g, more preferably 120 mgKOH/g, and still more preferably 100 mgKOH/g. In addition, a preferably range is 20 to 140 mgKOH/g, more preferably 40 to 120 mgKOH/g, and still more preferably 60 to 100 mgKOH/g. When an acid value is less than 20 mgKOH/g, there is a possibility that cement dispersing performance is remarkably reduced. When an acid value exceeds 140 mgKOH/g, there is a possibility that slump-retaining ability is remarkably reduced.

The acid value means an amount (mgKOH/g) of potassium hydroxide consumed by neutralization when 1 g of a polymer is neutralized with potassium hydroxide (KOH). For example, the acid value can be obtained as follows:
[Method of Measuring Acid Value]
80 ml of acetone and 10 ml of water were added to 0.5 to 1 g of a solution of a polymer whose acid value is sought to obtain, they are stirred to uniformly dissolve, a solution is titrated with an automated titration apparatus ("COM-555" manufactured by Hiranuma Sangyo) using an 0.1 mol/L KOH aqueous solution as a titration solution to measure an acid value of a solution. On the other hand, 2 ml of acetone is added to 1.0 g of the aforementioned polymer solution to dissolve the polymer to obtain a solution. The solution is subsequently naturally dried at a normal temperature, dried for 5 hours under reduced pressure (160° C./5 mmHg), then allowed to cool in a desiccator, and a weight is measured. Thereafter, an acid value (mgKOH/g) of a polymer is calculated from an acid value of a solution and a resin solid matter of a solution.

When the cement admixture of the present invention is used, a flow stop value of a concrete is preferably 15 seconds or shorter. When the value exceeds 15 seconds, there is a possibility that work can not be sufficiently done at a field handling a cement composition. The value is more preferably 14 seconds or shorter, and still more preferably 13 seconds or shorter.

The flow stop value can be measured as follows:

A concrete having the following composition is prepared, a cement admixture is added at about 0.25% by weight relative to 100% by weight of a concrete, an amount of an air is adjusted to 3 to 4%, and the time required from a point that a slump cone is pulled up to a point that fluidization of concrete was stopped when an initial (0 min) slump flow value is measured to obtain the flow stop value. Measurement of the slump flow value and an amount of the air can be performed according to Japanese Industrial Standards (JIS A 1101, 1128, 6204).

[Concrete Formulation]

Water: 172 kg/m³

Cement (manufactured by Taiheiyo Cement, manufactured by Sumitomo Osaka Cement, manufactured by Ube Mitsubishi Cement: normal portland Cement): 491 kg/m³

Fine filler (Ohigawa river sand): 744.5 kg/m³

Clued filler (Aoume-produced ground stone): 909.8 kg/m³

W/C: 35%

As described above, it is preferable that a copolymer in the present invention is obtained by polymerizing a polyalkylene glycol unsaturated monomer as a monomer component. In addition, it is preferable that the copolymer contains an unsaturated carboxylic acid monomer as a monomer component and, if necessary, may contain a monomer copolymerizable with the monomer.

When the copolymer is a salt of a carboxylic acid, for example, an alkali metal salt, an alkaline earth metal salt and an ammonium salt are used. Alternatively, a monomer as a carboxylic acid salt may be polymerized, or a monomer of carboxylic acid may be polymerized and, thereafter, a salt may be formed.

A ratio of a polyalkylene glycol unsaturated monomer and an unsaturated carboxylic acid monomer to be contained in the monomer component is 0.1 or more, preferably 2 or less, more preferably 0.3 or more and 1.2 or less, as expressed by polyalkylene glycol unsaturated monomer/unsaturated carboxylic acid monomer (mole ratio).

It is preferable that the polyalkylene glycol unsaturated monomer contains an essential oxyalkylene group having 3 or more carbon atoms. As such the polyalkylene glycol unsaturated monomer, for example, a monomer represented by the following formula (3) is preferable.

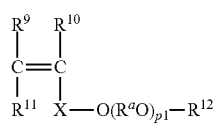
(3)

In the above formula (3), $R^9$, $R^{10}$ and $R^{11}$ are the same or different and each represents a hydrogen atom or a methyl group. $R^{12}$ represents a hydrogen atom or a hydrocarbon group containing 1 to 30 carbon atoms. $R^a$ may be the same or different and each represents an alkylene group containing 2 to 18 carbon atoms, and $R^a$ is containing 3 or more carbons at least one alkylene group. p1 represents the average molar number of addition of the oxyalkylene group and is a number of 1 to 300. X represents divalent alkylene group containing 1 to 5 carbon atoms or represents that —CO— bond or —$R^b$— CO— bond or direct bond. In case X represents the direct bond, the carbon atom and oxygen atom bonded thereto are directly bond to each other. $R^b$ represents divalent alkylene group containing 1 to 5 carbon atoms.

At least one species of oxyalkylene group represented by —($R^a$O)— in the above formula (3) is oxyalkylene group which containing 3 or more carbon atoms.

In cases where two or more oxyalkylene group occur in the same monomer, the oxyalkylene groups represented by —($R^a$O)— may be in any addition embodiment, namely random addition, block addition, alternate addition or the like.

The oxyalkylene group(s) represented —($R^a$O)— as mentioned above is an alkylene oxide adduct which consists of alkylene oxide groups containing 2 to 18 carbon atoms. And at least one alkylene oxide containing 3 or more carbons is added to. Such alkylene oxide adduct has a structure formed by one or two or more of alkylene oxides such as ethylene oxide, propylene oxide, butylene oxide, isobutylene oxide, 1-butene oxide and 2-butene oxide. Among such alkylene oxide adducts, propylene oxide and butylene oxide adducts are preferred. Still more preferably, the structure contains an addition of ethylene oxides.

In other word, it is more preferably that the structure contains oxypropylene group and/or oxybutylene group as essential constituents, and oxyethylene group. In this case, it contains 50 to 95 mol % of oxyethylene group relative to 100 mol % of all the oxyalkylene group. If it is less than 50 mole %, the hydrophilicity of the oxyalkylene groups may possibly become insufficient to decrease dispersing ability of cement particles. More preferably not less than 60 mol %, still more preferably not less than 70 mol %, especially more preferably not less than 80 mol %, most preferably not less than 90 mol %.

The average molar number p1 of addition of oxyalkylene groups represented by the above $R^a$O is a number of 1 to 300. If p1 exceeds 300, the polymerizability of the monomer will decrease.

To obtain excellent fluidity, a preferred range of p1 is not less than 3 but not more than 280. More preferably, m is not less than 5, still more preferably not less than 10, especially preferably not less than 20. On the other hand, p1 is more preferably not more than 250, especially preferably not more than 150.

For preparing concrete compositions low in viscosity, as for the range of p1, it is preferably not less than 3, more preferably not less than 4, still more preferably not more than 5. On the other hand, it is preferably not more than 100, more preferably not more than 50, still more preferably not more than 30, especially preferably not more than 25.

In —($R^a$O)$_{p1}$— in the above formula (3), as for the average molar number of addition of the oxyalkylene group containing 3 or more carbon atoms, it is preferably not less than 0.2, more preferably not less than 0.5 but not more than 10. Still more preferably, it is not less than 1 but not more than 7. Setting the average molar number of addition in such a range, it may decrease the viscosity of cement composition or like well enough.

As for the average molar number of addition of the oxyalkylene group(s), it is preferably not less than 2. If the average molar number of addition of the oxyethylene group(s) is less than 2, it may not obtain enough hydrophilic property to disperse cement particles or like and may not obtain the excellent fluidity.

More preferably not less than 3, still more preferably not less than 5, especially preferable not less than 10. On the other hand, more preferably not more than 280, still more preferably not more than 250, especially preferably not more than 200, most preferably not more than 150.

The average molar number of addition means the average value for the molar number of the oxyalkylene group(s) in one mole of group formed by oxyalkylene group.

It is possible to use, as said monomer represented by formula (3) mentioned above, a combination of two or more monomer species differing in the average molar number p1 of addition of the oxyalkylene group(s). As a suitable combination, there may be mentioned, for example, a combination of two monomer species differing the average molar number p1 of addition by not more than 10 (preferably a difference in p1 by not more than 5), a combination of two monomer species differing in the average molar number p1 of addition by not less than 10 (preferably a difference in p1 by not less than 15), or a combination of not less than three monomer species differing in p1 by not less than 10 (preferably a difference in p1 by not less than 15) from one another. Furthermore, as for the range of p1 for combined use, it is possible to combine a monomer having an average molar number p1 of addition in the range of 40 to 300 with a monomer having the range of 1 to 40 (the difference in p1 being not less than 10, preferably not less than 15), or combine a monomer having an average molar number p1 of addition in the range of 20 to 300 with a monomer having the range of 1 to 20 (the difference in p1 being not less than 10, preferably not less than 15).

In case the monomer is polyalkylene glycol ester monomer represented by above mentioned formula (3), as for oxyalkylene group represented by $-(R^aO)_{p1}-$, from the viewpoint of esterification productivity improvement with (meth) acrylic acid, it is preferred that the ethylene oxide moiety be added to the site of the ester bond with (meth)acrylic acids monomer ($R^9R^{11}C=CR^{10}-COOH$).

When a carbon number of the $R^{12}$ exceeds 30, since hydrophobicity of the cement admixture of the present invention becomes too strong, there is a possibility that better dispersity cannot be obtained. From a viewpoint of dispersity, a preferable embodiment of $R^{12}$ is a hydrocarbon group having 1 to 20 carbon atom(s) or hydrogen, more preferably a hydrocarbon group having 10 or less carbon atom(s), still more preferably a hydrocarbon group having 5 or less carbon atom(s), still more preferably a hydrocarbon group having 3 or less carbon atom(s), and particularly preferably a hydrocarbon group having 2 or less carbon atom(s). Among a hydrocarbon group, a saturated alkyl group and an unsaturated alkyl group are preferable. These alkyl groups may be straight or branched. In addition, in order to manifest excellent material separation preventing performance, and make an amount of the air brought in a cement composition appropriate, a hydrocarbon group having 5 or more carbon atoms is preferable, and a hydrocarbon group having 20 or less carbon atoms is preferable. More preferable is a hydrocarbon group having 5 to 10 carbon atoms. Among a hydrocarbon group, a saturated alkyl group and an unsaturated alkyl group are preferable. These alkyl groups may be straight or branched.

When there are two or more kinds of oxyalkylene groups in the same monomer as described above, the aforementioned polyalkylene glycol unsaturated monomer may be any addition form of an oxyalkylene group represented by $-(R^aO)-$ such as random addition, block addition and alternate addition. For example, in the case of a form of block addition, a monomer represented by the following formula (4) is preferable.

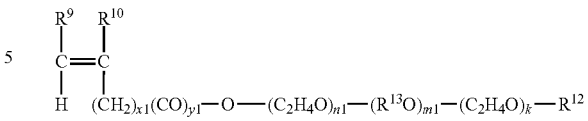

(4)

In the formula, $R^9$ and $R^{10}$ are the same or different, and represent a hydrogen atom or a methyl group. $R^{13}$s are the same or different, and represent an alkylene group having 3 to 18 carbon atoms. And, x1 represents a number of 0 to 2, y1 represents 0 or 1, n1 and k represent an average molar number of addition of an oxyethylene group, n1 is a number of 1 to 200, k is a number of 1 to 200, m1 represents an average molar number of addition of an oxyalkylene group, and is a number of 1 to 50, and n1+m1+k is a number of 3 to 200. $R^{12}$ represents a hydrogen atom or a hydrocarbon group having 1 to 20 carbon atom(s).

In the formula (4), n1 and k may be the same or different, and are a number of 1 to 200. When they exceed 200, a viscosity is increased, and workability is inferior in some cases, and they are preferably 1 to 60, and more preferably 1 to 20. m1 is a number of 1 to 50 and, when m1 exceeds 50, water-reducing property is reduced, hydrophobicity is increased, an admixture is not compatible with mixing water to be added to a cement, and workability is inferior in some cases. A range of m1 is preferably 1 to 20, more preferably 1 to 5, and still more preferably 1 to 3. And, n1+m1+k which is a sum of n1, m1 and k is a number of 3 to 200. And when this exceeds 200, a viscosity is increased, and workability is inferior in some cases, and the sum is preferably 5 to 120, more preferably 5 to 100, and still more preferably 5 to 50. $R^{13}$s may be the same or different, and represent an alkylene group having 3 to 18 carbon atoms, and it is preferably a 2-methylethylene group having 3 carbon atoms (generally, a precursor thereof is propylene oxide). $R^{12}$ represents a hydrogen atom or a hydrocarbon group having 1 to 20 carbon atom(s), preferably a methyl group.

A monomer represented by the formula (4) can be obtained by adding ethylene oxide in a proper amount so as to give the prescribed repeating number to an unsaturated alcohol or an unsaturated carboxylic acid; adding alkylene oxide containing 3 to 18 carbon atoms in a proper amount so as to give the prescribed repeating number; and adding ethylene oxide in a proper amount so as to give the prescribed repeating number. Furthermore, the monomer can also be obtained by esterification of an alcohol, which is obtained by adding ethylene oxide in a proper amount so as to give the prescribed repeating number to an alcohol or a phenol comprising a hydrocarbon group containing 1 to 20 carbon atoms, adding alkylene oxide of 3 to 18 carbon atoms in a proper amount so as to give the prescribed repeating number, and adding ethylene oxide in a proper amount so as to give the prescribed repeating number, with an unsaturated carboxylic acid or ester exchange reaction of the alcohol with an unsaturated carboxylic acid ester.

As the unsaturated alcohol, it is preferable that vinyl alcohol, allyl alcohol, methallyl alcohol, 3-butene-1-ol, 3-methyl-3-butene-1-ol, 3-methyl-2-butene-1-ol, 2-methyl-3-butene-2-ol, 2-methyl-2-butene-1-ol, 2-methyl-3-butene-1-ol and the like. As unsaturated carboxylic acid, acrylic acid and methacrylic acid are preferable. Further, as unsaturated carboxylic acid ester, alkylester of these unsaturated carboxylic acids can be used. As alkylene oxide having 3 to 18 carbon atoms, propylene oxide, butylene oxide, and an epoxylated unsaturated hydrocarbon are preferable. Among them, propylene oxide is preferable.

As the aforementioned alcohol or phenol having a hydrocarbon group having 1 to 20 carbon atom(s), alkyl alcohol such as methanol, ethanol, and butanol; alcohol having an aryl group such as benzyl alcohol; phenols such as phenol and paramethylphenol are preferable. Among them, alcohol of a carbon number of 1 to 3 such as methanol, ethanol and butanol is preferable.

A ratio of a monomer unit formed by a compound represented by the formula (4) relative to a total weight of the copolymer is preferably 10 to 95% by weight, more preferably 50 to 90% by weight, and still more preferably 65 to 85% by weight. In addition, when the copolymer is obtained by copolymerizing a monomer (X) represented by the formula (4) and an unsaturated carboxylic acid monomer (Y), relative to 100% by weight of the total weight of (X) and (Y), (X) is preferably 10 to 95% by weight, more preferably 50 to 90% by weight, and still more preferably 65 to 85% by weight. In addition, a copolymerizable monomer other than (X) and (Y) may be used as a copolymerizable composition and, relative to 100% by weight of the total weight of (X) and (Y), an amount of the monomer to be used is 0 to 50% by weight.

A monomer not having an oxyalkylene group having 3 or more carbon atoms may be used jointly with the polyalkylene glycol unsaturated monomer. That is, a monomer in which an oxyalkylene group represented by —(R″O)— in the formula (3) is all an oxyethylene group may be used. Such the polyalkylene glycol unsaturated monomer is the same except that an oxyalkylene group having 3 or more carbon atoms does not contain in the aforementioned polyalkylene glycol unsaturated monomer.

Suited as the polyalkylene glycol unsaturated monomer, that is, a polyalkylene glycol unsaturated monomer having an oxyalkylene group having 3 or more carbon atoms and a polyalkylene glycol unsaturated monomer not having an oxyalkylene group having 3 or more carbon atoms are, for example, an unsaturated alcohol-polyalkylene glycol adduct and a polyalkylene glycol ester monomer.

The above-mentioned unsaturated alcohol-polyalkylene glycol adduct may be any compounds that have a structure in which a polyalkylene glycol chain is added to an alcohol containing an unsaturated group. The above mentioned polyalkylene glycol ester monomer may be any of monomers that have a structure in which an unsaturated group is bonded to a polyalkylene glycol chain via an ester bond. Preferred is an unsaturated carboxylic acid polyalkylene glycol ester compound, and particularly preferred is (alkoxy)polyalkylene glycol mono(meth)acrylate.

Suitable as the above-mentioned unsaturated alcohol-polyalkylene glycol adduct are, for example, a vinyl alcohol-alkylene oxide adduct, (meth)allyl alcohol-alkylene oxide adduct, 3-buten-1-ol-alkylene oxide adduct, isoprene alcohol (3-methyl-3-buten-1-ol)-alkylene oxide adduct, 3-methyl-2-buten-1-ol-alkylene oxide adduct, 2-methyl-3-buten-2-ol-alkylene oxide adduct, 2-methyl-2-buten-1-ol-alkylene oxide adduct, 2-methyl-3-buten-1-ol-alkylene oxide adduct and the like.

Suitable as the above-mentioned unsaturated alcohol-polyalkylene glycol adduct are also polyethylene glycol monovinyl ether, methoxy polyethylene glycol monovinyl ether, polyethylene glycol mono(meth)allyl ether, methoxy polyethyleneglycolmono(meth)allylether, polyethylene glycol mono(2-methyl-2-propenyl)ether, polyethylene glycol mono (2-butenyl)ether, polyethylene glycol mono(3-methyl-3-butenyl)ether, polyethylene glycol mono(3-methyl-2-butenyl)ether, polyethylene glycol mono(2-methyl-3-butenyl) ether, polyethylene glycol mono(2-methyl-2-butenyl)ether, polyethylene glycol mono(1,1-dimethyl-2-propenyl)ether, polyethylene-polypropylene glycol mono(3-methyl-3-butenyl)ether, methoxypolyethylene glycol mono(3-methyl-3-butenyl)ether, ethoxypolyethylene glycol mono(3-methyl-3-butenyl)ether, 1-propoxypolyethylene glycol mono(3-methyl-3-butenyl)ether, cyclohexyloxypolyethylene glycol mono(3-methyl-3-butenyl)ether, 1-octyloxypolyethyleneglycol mono(3-methyl-3-butenyl)ether, nonylalkoxypolyethylene glycol mono(3-methyl-3-butenyl)ether, laurylalkoxypolyethylene glycol mono(3-methyl-3-butenyl)ether, stearylalkoxypolyethylene glycol mono(3-methyl-3-butenyl)ether, phenoxypolyethylene glycol mono(3-methyl-3-butenyl)ether, naphthoxypolyethylene glycol mono(3-methyl-3-butenyl)ether, methoxypolyethylene glycol monoallyl ether, ethoxypolyethylene glycol monoallyl ether, phenoxypolyethylene glycol monoallyl ether, methoxypolyethylene glycol mono(2-methyl-2-propenyl)ether, ethoxypolyethylene glycol mono(2-methyl-2-propenyl)ether, phenoxypolyethylene glycol mono(2-methyl-2-propenyl)ether and the like.

The above-mentioned (alkoxy)polyalkylene glycol mono (meth)acrylate may be the one mentioned above, but suitable are esterification products of (meth)acrylic acid with alkoxypolyalkylene glycols, especially preferably alkoxypolyalkylene glycols which are mainly formed of an ethylene oxide group(s), obtained by addition of 1 to 300 moles of an alkylene oxide group(s) containing 2 to 18 carbon atoms to any of aliphatic alcohols containing 1 to 30 carbon atoms such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol and stearyl alcohol; alicyclic alcohols containing 3 to 30 carbon atoms such as cyclohexanol; and unsaturated alcohols containing 3 to 30 carbon atoms such as (meth)allyl alcohol, 3-buten-1-ol and 3-methyl-3-buten-1-ol.

Suitable as said esterification products are those (alkoxy) polyethylene glycol (poly) (alkylene glycol containing 2 to 4 carbon atoms) (meth)acrylates which are given below: Methoxypolyethylene glycol mono(meth)acrylate, methoxy{polyethylene glycol-(poly)propylene glycol}mono (meth)acrylate, methoxy{polyethylene glycol-(poly)butylene glycol}mono(meth)acrylate, methoxy{polyethylene glycol-(poly)propylene glycol-(poly)butylene glycol}mono (meth)acrylate, ethoxypolyethylene glycol mono(meth)acrylate, ethoxy{polyethylene glycol-(poly)propylene glycol}mono(meth)acrylate, ethoxy{polyethylene glycol-(poly)butylene glycol}mono(meth)acrylate, ethoxy{polyethylene glycol-(poly) propylene glycol-(poly) butylene glycol}mono(meth)acrylate, propoxypolyethylene glycol mono(meth)acrylate, propoxy{polyethylene glycol-(poly)propylene glycol}mono(meth)acrylate, propoxy{polyethylene glycol-(poly)butylene glycol}mono (meth)acrylate, propoxy{polyethylene glycol-(poly)propylene glycol-(poly)butylene glycol}mono(meth)acrylate, butoxypolyethylene glycol mono(meth)acrylate, butoxy{polyethylene glycol-(poly)propylene glycol}mono (meth)acrylate, butoxy{polyethylene glycol-(poly)butylene glycol}mono(meth)acrylate, butoxy{polyethylene glycol-(poly)propylene glycol-(poly)butylene glycol}mono(meth) acrylate, pentoxypolyethylene glycol mono(meth)acrylate, pentoxy{polyethylene glycol-(poly)propylene glycol}mono (meth)acrylate, pentoxy{polyethylene glycol-(poly)butylene glycol}mono(meth)acrylate, pentoxy{polyethylene glycol-(poly)propylene glycol-(poly)butylene glycol}mono(meth)

acrylate, hexoxypolyethylene glycol mono(meth)acrylate, hexoxy{polyethylene glycol-(poly)propylene glycol}mono(meth)acrylate, hexoxy{polyethylene glycol-(poly)butylene glycol}mono(meth)acrylate, hexoxy{polyethylene glycol-(poly)propylene glycol-(poly)butylene glycol}mono(meth)acrylate, heptoxypolyethylene glycol mono(meth)acrylate, heptoxy{polyethylene glycol-(poly)propylene glycol}mono(meth)acrylate, heptoxy{polyethylene glycol-(poly) butylene glycol}mono(meth)acrylate, heptoxy{polyethylene glycol-(poly)propylene glycol-(poly)butylene glycol}mono(meth)acrylate, octoxypolyethylene glycol mono(meth)acrylate, octoxy{polyethylene glycol-(poly)propylene glycol}mono(meth)acrylate, octoxy{polyethylene glycol-(poly)butylene glycol}mono(meth)acrylate, octoxy{polyethylene glycol-(poly)propylene glycol-(poly)butylene glycol}mono(meth)acrylate, nonanoxypolyethylene glycol mono(meth)acrylate, nonanoxy{polyethylene glycol-(poly)propylene glycol}mono(meth)acrylate, nonanoxy{polyethylene glycol-(poly)butylene glycol}mono(meth)acrylate, nonanoxy{polyethylene glycol-(poly)propylene glycol-(poly)butylene glycol}mono(meth)acrylate, decanoxypolyethylene glycol mono(meth)acrylate, decanoxy{polyethylene glycol-(poly)propylene glycol}mono(meth)acrylate, decanoxy{polyethylene glycol-(poly)butylene glycol}mono(meth)acrylate, decanoxy{polyethylene glycol-(poly)propylene glycol-(poly)butylene glycol}mono(meth)acrylate, undecanoxypolyethylene glycol mono(meth)acrylate, undecanoxy{polyethylene glycol-(poly)propylene glycol}mono(meth)acrylate, undecanoxy{polyethylene glycol-(poly)butylene glycol}mono(meth)acrylate, undecanoxy{polyethylene glycol-(poly)propylene glycol-(poly)butylene glycol}mono(meth)acrylate, dodecanoxypolyethylene glycol mono(meth)acrylate, dodecanoxy{polyethylene glycol-(poly)propylene glycol}mono(meth)acrylate, dodecanoxy{polyethylene glycol-(poly)butylene glycol}mono(meth)acrylate, dodecanoxy{polyethylene glycol-(poly)propylene glycol-(poly)butylene glycol}mono(meth)acrylate, tridecanoxypolyethylene glycol mono(meth)acrylate, tridecanoxy{polyethylene glycol-(poly)propylene glycol}mono(meth)acrylate, tridecanoxy{polyethylene glycol-(poly)butylene glycol}mono(meth)acrylate, tridecanoxy{polyethylene glycol-(poly)propylene glycol-(poly)butylene glycol}mono(meth)acrylate, tetradecanoxypolyethylene glycol mono(meth)acrylate, tetradecanoxy{polyethylene glycol-(poly)propylene glycol}mono(meth)acrylate, tetradecanoxy{polyethylene glycol-(poly)butylene glycol}mono(meth)acrylate, tetradecanoxy{polyethylene glycol-(poly)propylene glycol-(poly)butylene glycol}mono(meth)acrylate, pentadecanoxypolyethylene glycol mono(meth)acrylate, pentadecanaboxy{polyethylene glycol-(poly)propylene glycol}mono(meth)acrylate, pentadecanoxy{polyethylene glycol-(poly)butylene glycol}mono(meth)acrylate, pentadecanoxy{polyethylene glycol-(poly)propylene glycol-(poly)butylene glycol}mono(meth)acrylate, hexadecanoxypolyethylene glycol mono(meth)acrylate, hexadecanoxy{polyethylene glycol-(poly)propylene glycol}mono(meth)acrylate, hexadecanoxy{polyethylene glycol-(poly)butylene glycol}mono(meth)acrylate, hexadecanoxy{polyethylene glycol-(poly)propylene glycol-(poly)butylene glycol}mono(meth)acrylate, heptadecanoxypolyethylene glycol mono(meth)acrylate, heptadecanoxy{polyethylene glycol-(poly)propylene glycol}mono(meth)acrylate, heptadecanoxy{polyethylene glycol-(poly)butylene glycol}mono(meth)acrylate, heptadecanoxy{polyethylene glycol-(poly)propylene glycol-(poly)butylene glycol}mono(meth)acrylate, octadecanoxypolyethylene glycol mono(meth)acrylate, octadecanoxy{polyethylene glycol-(poly)propylene glycol}mono(meth)acrylate, octadecanoxy{polyethylene glycol-(poly)butylene glycol}mono(meth)acrylate, octadecanoxy{polyethylene glycol-(poly)propylene glycol-(poly)butylene glycol}mono(meth)acrylate, nonadecanoxypolyethylene glycol mono(meth)acrylate, nonadecanoxy{polyethylene glycol-(poly)propylene glycol}mono(meth)acrylate, nonadecanoxy{polyethylene glycol-(poly)butylene glycol}mono(meth)acrylate, nonadecanoxy{polyethylene glycol-(poly)propylene glycol-(poly)butylene glycol}mono(meth)acrylate, cyclopentoxypolyethylene glycol mono(meth)acrylate, cyclopentoxy(polyethylene glycol-(poly)propylene glycol) mono(meth)acrylate, cyclopentoxy{polyethylene glycol-(poly)butylene glycol}mono(meth)acrylate, cyclopentoxy{polyethylene glycol-(poly)propylene glycol-(poly)butylene glycol}mono(meth)acrylate, cyclohexoxypolyethylene glycol mono(meth)acrylate, cyclohexoxy{polyethylene glycol-(poly)propylene glycol}mono(meth)acrylate, cyclohexoxy{polyethylene glycol-(poly)butylene glycol}mono(meth)acrylate, cyclohexoxy{polyethylene glycol-(poly)propylene glycol-(poly)butylene glycol}mono(meth)acrylate.

As the aforementioned (alkoxy)polyalkylene glycol mono(meth)acrylate, in addition to the aforementioned compounds, it is preferable that phenoxypolyethylene glycol mono(meth)acrylate, phenoxy{polyethylene glycol (poly)(propyleneglycol)}mono(meth)acrylate, phenoxy{polyethylene glycol (poly)butylene glycol}mono(meth)acrylate, phenoxy{polyethylene glycol (poly)propylene glycol (poly)butylene glycol}mono(meth)acrylate, (meth)allyloxypolyethylene glycol mono(meth)acrylate, (meth)allyloxy{polyethylene glycol (poly) propylene glycol}mono(meth)acrylate, (meth)allyloxy{polyethylene glycol (poly)butylene glycol}mono(meth)acrylate, (meth)allyloxy{polyethylene glycol (poly)propylene glycol (poly) butylene glycol}mono(meth)acrylate.

As the aforementioned polyalkylene glycol unsaturated monomer, in addition to the aforementioned monomers, (alkoxy)polyalkylene glycol monomaleic acid ester, and (alkoxy) polyalkylene glycol dimaleic acid ester are preferable. As such a monomer, the followings are preferable.

Half esters and diesters derived from alkyl(poly) alkylene glycols obtained by addition of 1 to 500 moles of an oxyalkylene containing 2 to 18 carbon atoms to an alcohol containing 1 to 30 carbon atoms or an amine containing 1 to 30 carbon atoms and the above-mentioned unsaturated dicarboxylic acid monomers; half esters and diesters derived from the above-mentioned unsaturated dicarboxylic acid monomers and polyalkylene glycols having an average number of moles of a glycol(s) containing 2 to 18 carbon atoms as added of 2 to 500; half amides of maleamic acid with polyalkylene glycols having an average number of moles of a glycol(s) containing 2 to 18 carbon atoms as added of 2 to 500; (poly)alkylene glycol di(meth)acrylates such as triethylene glycol di(meth)acrylate, (poly)ethylene glycol di(meth)acrylate, polypropylene glycol di(meth)acrylate, and (poly) ethylene glycol-(poly) propylene glycol di(meth)acrylate; (poly) alkylene glycol dimaleates such as triethylene glycol dimaleate and polyethylene glycol dimaleate; and the like.

The aforementioned unsaturated carboxylic acid monomer may be a monomer having a group capable of forming a carboanion with a polymerizable unsaturated group, preferably a compound represented by the following formula (5).

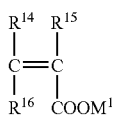

(5)

In the formula, $R^{14}$, $R^{15}$ and $R^{16}$ may be the same or different, represent a hydrogen atom, a methyl group, or —$(CH_2)z1COOM^2$, and $z^1$ represents a number of 0 to 2. —$(CH_2)z1COOM^2$ may form an anhydride with —$COOM^1$ or other —$(CH_2)z1COOM^2$. $M^1$ and $M^2$ may be the same or different, and represent a hydrogen atom, a metal atom, an ammonium group or an organic amine group (organic ammonium group).

As a metal atom in $M^1$ and $M^2$ in the formula (5), it is preferable that a monovalent metal atom such as an alkali metal atom, for example lithium, sodium and potassium; a divalent metal atom such as an alkaline earth metal atom, for example calcium and magnesium; a trivalent metal atom, for example aluminum and iron are preferable. As an organic amine group, an alkanolamine group such as an ethanolamine group, a diethanolamine group, and a triethanolamine group, and a triethylamine group are preferable. Further, the organic amine group may be an ammonium group.

As the unsaturated carboxylic acid monomer, an unsaturated monocarboxylic acid monomer and an unsaturated dicarboxylic acid monomer are preferable. The unsaturated monocarboxylic acid monomer may be a monomer having each one of an unsaturated group and a group capable of forming a carboanion in a molecule. For example, acrylic acid, methacrylic acid, and crotonic acid; their monovalent metal salt, divalent metal salt, ammonium salt, and organic amine salt are preferable. Among them, from a viewpoint of improvement in cement dispersing performance, it is more preferable to use methacrylic acid; its monovalent metal salt, divalent metal salt, ammonium salt, or organic amine salt.

The unsaturated dicarboxylic acid monomer may be a monomer having one unsaturated group and two groups capable of forming a carboanion in a molecule. Maleic acid, itaconic acid, citraconic acid, and fumaric acid, and their monovalent metal salt, divalent metal salt, ammonium salt and organic amine salt, and their anhydride are preferable.

As the unsaturated carboxylic acid monomer, in addition to them, a half ester of an unsaturated dicarboxylic acid monomer and an alcohol having 1 to 22 carbon atom(s), a half amide of unsaturated dicarboxylic acids and amine having 1 to 22 carbon atom(s), a half ester of an unsaturated dicarboxylic acid monomer and glycol having 2 to 4 carbon atoms, and a half amide of maleamic acid and glycol having 2 to 4 carbon atoms may be also used.

As a monomer copolymerizable with the aforementioned monomers, the following compounds can be used. (Meth) acrylic acid esters such as methyl(meth)acrylate, ethyl(meth) acrylate, propyl(meth)acrylate, butyl(meth)acrylate, pentyl (meth)acrylate, hexyl(meth)acrylate, decyl(meth)acrylate, and lauryl(meth)acrylate; difunctional (meth)acrylates such as hexanediol di(meth)acrylate; (meth)acrylate compounds such as hyroxyethyl(meth)acrylate, hydroxypropyl(meth) acrylate, methoxyethyl(meth)acrylate, ethoxyethyl(meth) acrylate, butoxyethylethyl(meth)acrylate, and methoxypropyl (meth)acrylate; amides of the aforementioned unsaturated monocarboxylic acid monomer and amine having 1 to 30 carbon atom(s), and unsaturated amides such as (meth)acrylamide, methyl(meth)acrylamide, (meth)acrylalkylamide, N-methylol(meth)acrylamide, and N,N-dimethyl (meth)acrylamide.

Half esters and diesters derived from unsaturated dicarboxylic acid as mentioned above and alcohols containing 1 to 30 carbon atoms; half amides and diamides derived from the above-mentioned unsaturated dicarboxylic acid monomer and an amine containing 1 to 30 carbon atoms; half esters and diesters derived from the above-mentioned unsaturated dicarboxylic acid monomer and glycol containing 2 to 18 carbon atoms; half amide derived from maleamine acid and glycol containing 2 to 18 carbon atom; multifunctional (meth)acrylate such as hexanediol di(meth)acrylate, trimethylolpropane tri(meth)acrylate and trimethylolpropane di(meth)acrylate; unsaturated sulfonic acids and monovalent metal salt, divalent metal salt, ammonium salt and organic ammonium salt thereof, for example, vinylsulfonate, (meth)allylsulfonate, 2-(meth)acryloxyethylsulfonate, 3-(meth)acryloxypropylsulfonate, 3-(meth)acryloxy-2-hydroxypropylsulfonate, 3-(meth)acryloxy-2-hydroxypropyl sulfophenyl ether, 3-(meth)acryloxy-2-hydroxypropyloxysulfobenzoate, 4-(meth)acryloxybutylsulfonate, (meth)acrylamidomethylsulfonate, (meth)acrylamidoethylsulfonate, 2-methylpropanesulfonic acid (meth)acrylamide, and styrenesulfonic acid; vinyl aromatic compounds such as styrene, α-methylstyrene, bromostyrene, chloroctyrene, vinyltoluene and p-methylstyrene; α-olefins such as hexene, heptene and decene; alkyl vinyl ethers such as methyl vinyl ether, ethyl vinyl ether and butyl vinyl ether; allyl esters such as allyl acetate; allyls such as allyl alcohol; alkanediol mono(meth) acrylates such as 1,4-butanediolmono(meth)acrylate, 1,5-pentanediol mono(meth)acrylate and 1,6-hexanediol mono (meth)acrylate; dienes such as butadiene, isoprene, isobutylene, 2-methyl-1,3-butadiene and 2-chloro-1,3-butadiene; unsaturated cyano compounds such as (meth)acrylonitrile and α-chloroacrylonitrile; unsaturated esters such as vinyl acetate and vinyl propionate; unsaturated amines such as aminoethyl (meth)acrylate, methylaminoethyl(meth)acrylate, dimethylaminoethyl(meth)acrylate, dimethylaminopropyl (meth)acrylate, dibutylaminoethyl(meth)acrylate and vinylpyridine; divinyl aromatics such as divinylbenzene; cyanurates such as triallyl cyanurate; and siloxane derivatives such as polydimethylsiloxanepropylaminomaleamidic acid, polydimethylsiloxaneaminopropyleneaminomaleamidic acid, polydimethylsiloxane-bis(propylaminomaleamidic acid), polydimethylsiloxane-bis(dipropyleneaminomaleamidic acid), polydimethylsiloxane-(1-propyl-3-acrylate), polydimethylsiloxane-(1-propyl-3-methacrylate), polydimethylsiloxane-bis(1-propyl-3-acrylate) and polydimethylsiloxane-bis(1-propyl-3-methacrylate).

As the aforementioned copolymerizable monomer, a polyalkyleneimine monomer having a polymerizable unsaturated group and an polyoxyalkylene group, and a monomer having a structure in which an oxyalkylene group is bound to a polyhydric alcohol residue may be also used, and examples include (1) a macromer in which glycidyl methacrylate is added to a multi-branched polymer obtained by adding alkylene oxide to polyalkyleneimine, (2) a (meth)acrylic acid ester macromer of a multi-branched polymer in which alkylene oxide is added to polyalkyleneimine, and (3) a maleic acid ester macromer of a multi-branched polymer in which alkylene oxide is added to polyalkyleneimine, that is, an ethylene monomer having a multi-branched polyoxyalkylene group of (1) to (3). As the multi-branched polymer, polyamidopolyamine or polyhydric alcohol to which alkylene oxide is added may be used.

Examples of the polyalkyleneimine include a homopolymer and a copolymer obtained by polymerizing one or more kind(s) of alkyleneimines having 2 to 8 carbon atoms such as ethyleneimine, propyleneimine, 1,2-butyleneimine, 2,3-butyleneimine, and 1,1-dimethylethyleneimine by a conventional method. It is preferable that they are formed using ethyleneimine as a main component. Such the polyalkyleneimine may be any of a straight structure, a branched structure, and a three-dimensionally crosslinked structure. Further examples may include ethylenediamine, diethylenetriamine, triethylenetetramine, and tetraethylenepentamine. Such the polyalkyleneimine has usually a primary amino group or a secondary amino group (imino group) having an active hydrogen atom in addition to a tertiary amino group in a structure.

A weight average molecular weight of the polyalkyleneimine is preferably 100 to 1,000,000, more preferably 300 to 50,000, and still more preferably 600 to 10,000.

As alkylene oxide to be added to the aforementioned polyalkyleneimide, alkylene oxide having 2 to 8 carbon atoms such as ethylene oxide, propylene oxide, butylene oxide, isobutylene oxide, 1-butene oxide, 2-butene oxide, trimethylethylene oxide, tetramethylene oxide, tetramethylethylene oxide, butadiene monoxide, and octylene oxide, and alicyclic epoxide such as dipentaneethylene oxide, and dihexaneethylene oxide; alicyclic epoxide such as trimethylene oxide, tetramethylene oxide, tetrahydrofuran, tetrahydropyran, and octylene oxide; aromatic epoxide such as styrene oxide, and 1,1-diphenylethylene oxide are preferable. Among them, ethylene oxide, propylene oxide, and butylene oxide are preferable. Further, entity containing ethylene oxide as a main component is more preferable.

In the alkylene oxide adduct, it is preferable that an average molar number of addition of an oxyalkylene group is, for example, not smaller than 0.5 and not larger than 300. The mole number is more preferably 1 or more, and still more preferably 1.5 or more, particularly preferably 2 or more, most preferably 3 or more. In addition, the mole number is more preferably 200 or less, and still more preferably 150 or less, particularly preferably 100 or less, most preferably 50 or less. When an average molar number of addition in an alkylene oxide adduct is outside such the range, there is a possibility that action and effect of a copolymer to make fluidity of a cement composition excellent are not sufficiently exerted.

In the cement admixture of the present invention, when one or more kind(s) of polymers other than a polycarboxylic acid copolymer having a polyalkylene glycol side chain containing an essential oxyalkylene group having 3 or more carbon atoms may be contained, it is preferable that the polymer is obtained by polymerizing a monomer component containing a polyalkylene glycol unsaturated monomer in which an oxyalkylene group represented by —($R^{a}o$)— in the formula (3) is all an oxyethylene group. Preferably, a monomer component contains an unsaturated carboxylic acid monomer and, if necessary, it may contain other copolymerizable monomer. Such the polyalkylene glycol unsaturated monomer, unsaturated carboxylic acid monomer and other copolymerizable monomer are the same as those as described above. In addition, a weight average molecular weight is the same as that of a copolymer in the embodiment of (1).

In the cement admixture of the present invention, when a site represented by the formula (1) is not equivalent to a site represented by the formula (2) in a polycarboxilic acid copolymer having a polyalkylene glycol side chain containing an essential oxyalkylene group having 3 or more carbon atoms, a site represented by the formula (1) and a site represented by the formula (2) may be contained in at least one kind of the aforementioned copolymers having different acid value. Like this, an embodiment that the copolymer has a site represented by the formula (1) and a site represented by the formula (2) is one of preferable embodiments of the present invention.

It is preferable that the copolymer has a mole ratio of the site represented by the formula (1) and the site represented by the formula (2) in said polycarboxylic acid copolymer: (A)/(B) is 1/99 to 99/1, and that said polycarboxylic acid copolymer has a site in which $R^3O$ in the formula (1) is the following formula (6).

$(C_2H_4O)_r$—$(R^8O)_p$—$(C_2H_4O)_q$—      (6)

in the formula, $R^8$ represents an alkylene group having 3 to 18 carbon atoms; r and q are average molar numbers of addition of oxyethylene groups, and each represents a number of 0 to 300, provided that one of r and q is 0, the other is a number of 2 to 300; p represents an average molar number of addition of the oxyalkylene group, and is a number of 1 to 50, and r+p+q is a number of 3 to 300, and the site represented by the formula (2).

The copolymer is preferable such that a mole ratio of a site which is $R^3O$ in the formula (1) being the formula (6), and a site represented by the formula (2): (C)/(B) is 1/99 to 99/1.

The present invention is also a cement admixture, which comprises a polycarboxylic acid copolymer, wherein the polycarboxylic acid copolymer has a site represented by the formula (1) and a site represented by the formula (2). In addition, "to have a site represented by the formula (1) and a site represented by the formula (2)" means "to contain both of them when the formula (1) is not equivalent to the formula (2)"

In the present invention, a polycarboxylic acid copolymer is a polymer having two or more carboxylic acids and/or carboxylic acid salts in one molecule, and a polymer in which particular structures represented by the formula (1) and the formula (2) are introduced into sites constituting the polymer, or a polymer in which a particular structure in which $R^3O$ in the formula (1) is the formula (6), and a particular structure represented by the formula (2) are introduced, is suitably used.

A weight average molecular weight of the polycarboxylic acid copolymer is preferably 3,000 to 100,000, more preferably 5,000 to 80,000, and still more preferably 7,000 to 40,000 expressed as a weight average molecular weight (Mw) in terms of polyethylene glycol by GPC.

It is preferable that a polyoxyalkylene chain represented by a repetition number of m in the formula (1) contains 0.01 to 49 mole % of an oxyalkylene group having 3 or more carbon atoms having high hydrophobicity as a site thereof, and other part is an oxyalkylene group having two carbon atoms and having high hydrophilicity, that is, an oxyethylene group. This particular structure is one reason why water-reducing property is excellent and workability is excellent. The present invention is characterized in that this chain having hydrophilicity has a hydrophobic part in the interior thereof, thereby, both of water-reducing property and workability can be manifested.

In the present invention, a content of an oxyalkylene group having 3 or more carbon atoms having high hydrophobicity in a structure represented by the formula (1) can be an arbitrary content between 0.01 to 49 mole %, preferably 0.1 to 40 mole %, and still more preferably 0.5 to 30 mole %, particularly preferably 1 to 25 mole %, most preferably 2 to 20 mole %.

In the case where an polyoxyethylene chain represented by a repetition number of n in the formula (2) is contained, the present invention is characterized in that this chain having high hydrophilicity is also possessed, thereby, since excellent dispersing performance is exerted, an amount of a cement admixture to be added is not relatively large.

A mole ratio of a structure represented by the formula (1) and a structure represented by the formula (2): (1)/(2) may be an arbitrary ratio of 99/1 to 1/99. However, in particular, when workability of cement is paid a stress on, it is preferable that a structure represented by the formula (1) is contained much and, on the other hand, in particular, when an amount of a cement admixture to be added is paid a stress on, it is preferable that a structure represented by the formula (2) is contained much.

That is, in particular, when workability of cement is paid a stress on, a mole ratio of a structure represented by the formula (1) and a structure represented by the formula (2): (1)/(2) is preferably 99/1 to 10/90, and still more preferably 99/1 to 20/80, particularly preferably 99/1 to 30/70, most preferably 99/1 to 40/60.

On the other hand, in particular, when an amount of a cement admixture to be added is paid a stress on, a mole ratio of a structure represented by the formula (1) and a structure represented by the formula (2): (1)/(2) is preferably 1/99 to 90/10, and still more preferably 1/99 to 80/20, particularly preferably 1/99 to 70/30, most preferably 1/99 to 60/40.

A polyoxyalkylene chain represented by repetition numbers of r, p and q in the formula (6) is a format of A-B-A type block copolymerization and, since when this particular structure is contained, a hydrophilic block strongly manifests water-reducing property, and a hydrophobic block imparts more workability, a more excellent cement admixture is obtained.

Then, m in the formula (1) is a number of 1 to 300 and, when m exceeds 300, a viscosity is increased, and workability is inferior in some cases, and m is preferably 1 to 200, more preferably 1 to 100, and still more preferably 1 to 60, most preferably 1 to 40. $R^3$s are the same or different, and represent an alkylene group having 2 to 18 carbon atoms. 0.01 to 49 mole % of the alkylene group is an alkylene group having 3 to 18 carbon atoms, and a 2-methylethylene group (generally, propylene oxide is a precursor thereof) in which 0.01 to 49 mole % in $R^3$ has three carbon atoms is preferable. In addition, $R^3O$ represents one kind of, or a mixture of two or more kinds of oxyalkylene groups having 2 to 18 carbon atoms, and 0.01 to 49 mole % of the oxyalkylene group is an oxyalkylene group having 3 to 18 carbon atoms. When there are two or more kinds of oxyalkylene groups having 2 to 18 carbon atoms, they may be added in a block manner, or may be added in a random manner.

In the formula (1), $R^4$ represents a hydrogen atom or a hydrocarbon group having 1 to 20 carbon atom(s), preferably a methyl group.

And, n in the formula (2) is a number of 1 to 300 and, when n exceeds 300, a viscosity is increased, and workability is inferior in some times. Therefore, n is preferably 1 to 200, more preferably 1 to 100, and still more preferably 1 to 60, most preferably 1 to 40. $R^7$ represents a hydrogen atom or a hydrocarbon group having 1 to 20 carbon atom(s), preferably a methyl group.

And, r and q in the formula (6) are the same or different, and are a number of 0 to 300 and, when each of they exceeds 300, a viscosity is increased, and workability is inferior in some cases. Therefore, each of them is preferably 0 to 200, more preferably 1 to 100, and still more preferably 1 to 60, most preferably 1 to 40. And, p is a number of 1 to 50 and, when p exceeds 50, water-reducing property is reduced, hydrophobicity is increased, and an admixture is not compatible with mixing water to be blended in cement, and workability is inferior in some cases. And, a range of p is preferably 1 to 20, more preferably 1 to 10, and still more preferably 1 to 6, most preferably 1 to 4. And, r+p+q which is a sum of r, p and q is a number of 3 to 300 and, when the sum exceeds 300, a viscosity is increased, and workability is inferior in some cases. Therefore, the sum is preferably 4 to 200, more preferably 6 to 100, and still more preferably 6 to 60, most preferably 10 to 40. $R^8$s are the same or different, and represent an alkylene group having 3 to 18 carbon atoms, preferably 2-methylethylene group (generally, propylene oxide is a precursor) having three carbon atoms.

A polycarboxylic acid copolymer that is an essential component of the present invention is preferably a polymer of the following two types, and its synthesis route is not particularly limited.

Polymer type I: A polymer having sites represented by the formula (1) and the formula (2) and two or more carboxylic acids, and/or carboxylic acid salts in one molecule.

Polymer type II: A polymer having a site in which $R^3O$ in the formula (1) is the following the formula (6) and a site represented by the formula (2), and two or more carboxylic acids and/or carboxylic acid salts in one molecule.

A ratio of a total of a site represented by the formula (1) or a site in which $R^3O$ in the formula (1) is the formula (6), and a site represented by the formula (2) relative to a total weight of a polycarboxylic acid copolymer is preferably 10 to 95% by weight, more preferably 50 to 90% by weight, and still more preferably 65 to 85% by weight.

Examples of the aforementioned synthesis route include the following two routs.

Synthesis rout A: A polycarboxylic acid copolymer can be obtained by polymerizing one or more kind(s) of monomers having carboxylic acid or carboxylic acid salt and a polymerizable double bond in one molecule, one or more kind(s) of monomers (a) represented by the formula (7), and one or more kind(s) of monomers (b) represented by the following formula (8). In the case of a carboxylic acid salt, for example, an alkali metal salt, an alkaline earth metal salt, and an ammonium salt are used. Monomers of these carboxylic acid salts may be polymerized, or alternatively after a monomer of carboxylic acid is polymerized, a salt may be formed.

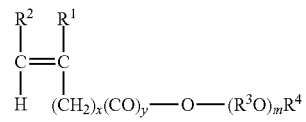

(7)

In the formula, $R^1$ and $R^2$ are the same or different, and represent hydrogen or a methyl group, x represents a number of 0 to 2, y represents 0 or 1, $R^3O$ represents one kind of, or a mixture of two or more kinds of oxyalkylene groups having 2 to 18 carbon atoms, and 0.01 to 49 mole % of the oxyalkylene group is an oxyalkylene group having 3 to 18 carbon atoms. In the case where there are two or more kinds of oxyalkylene groups having 2 to 18 carbon atoms, they may be added in a block manner, or may be added in a random manner. $R^4$ represents a hydrogen atom or a hydrocarbon group having 1 to 30 carbon atom(s), and m is an average molar number of addition of an oxyalkylene group, and represents a number of 3 to 300.

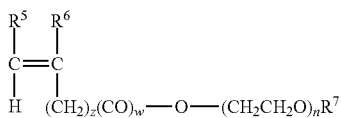

(8)

In the formula, $R^5$ and $R^6$ are the same or different, and represent hydrogen or a methyl group. Z represents a number of 0 to 2, and w represents 0 or 1. $R^7$ represents a hydrogen atom or a hydrocarbon group having 1 to 30 carbon atom(s), and n is an average molar number of addition of an oxyethylene group, and represents a number of 1 to 300.

Synthesis route B: A polycarboxylic acid copolymer can be obtained by polymerizing one or more kind(s) of monomers having carboxylic acid or a carboxylic acid salt and a polymerizable double bond in one molecule, one or more kind(s) or monomers (c) represented by the following formula (9), and one or more kind(s) of monomers (b) represented by the formula (8). In the case of a carboxylic acid salt, for example, an alkali metal salt, an alkaline earth metal salt, and an ammonium salt are used. Monomers of these carboxylic acid salts may be polymerized, or alternatively after a monomer of carboxylic acid is polymerized, a salt may be formed.

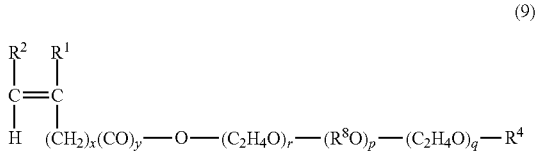

(9)

$R^8$ represents an alkylene group having 3 to 18 carbon atoms, r and q are an average molar number of addition of an oxyethylene group, and represent a number of 0 to 300 and, when one of them is 0, the other is a number of 2 to 300. And, p represents an average molar number of addition of an oxyalkylene group, and is a number of 1 to 50, and r+p+q is a number of 3 to 300. $R^4$ represents a hydrogen atom or a hydrocarbon group having 1 to 20 carbon atom(s).

A monomer (a) represented by the formula (7) can be obtained by adding an amount of a prescribed repetition number of ethylene oxide and an amount of a prescribed repetition number of alkylene oxide having 3 to 18 carbon atoms to unsaturated alcohol and/or unsaturated carboxylic acid. Alternatively, the monomer (a) may be obtained by an esterification reaction of an alcohol obtained by adding an amount of a prescribed repetition number of ethylene oxide and an amount corresponding to a prescribed repetition number of alkylene oxide having 3 to 18 carbon atoms to alcohol or phenol having a hydrocarbon group having 1 to 20 carbon atom(s) with unsaturated carboxylic acid, and/or an transesterification reaction with unsaturated carboxylic acid ester.

A monomer (b) represented by the formula (8) can be obtained by adding an amount corresponding to a prescribed repetition number of ethylene oxide to unsaturated alcohol and/or unsaturated carboxylic acid. Alternatively, a monomer (b) may be also obtained by an esterification reaction of an alcohol obtained by adding an amount corresponding to a prescribed repetition number of ethylene oxide to alcohol or phenols having a hydrocarbon group having 1 to 20 carbon atom(s) with unsaturated carboxylic acid, and/or a transesterification reaction with unsaturated carboxylic acid ester.

A monomer (c) represented by the formula (9) can be obtained by the method described for the formula (4).

Examples of a monomer having carboxylic acid or a carboxylic acid salt and a polymerizable double bond in one molecule which is copolymerizable with monomers represented by the formulas (7) to (9) include a monomer (d) represented by the formula (5).

When the polycarboxylic acid copolymer is obtained by copolymerizing a monomer (a) represented by the formula (7) or a monomer (c) represented by the formula (9), a monomer (b) represented by the formula (8) and a monomer (d) represented by the formula (5), relative to 100% by weight of the total weight, the total of (a) or (c) and (b) is preferably 10 to 95% by weight, more preferably 50 to 90% by weight, and still more preferably 65 to 85% by weight. In addition, a monomer other than (a), (b), (c) and (d) may be used as a copolymerizable component. Regarding the total weight of (a) or (c) and (b) and (d) as 100% by weight, the amounts of a monomer other than (a), (b), (c) and (d) is 0 to 50% by weight and, as other monomer, the aforementioned copolymerizable monomer is preferably used.

As a process for preparing the cement admixture of the present invention, (i) a process of separately preparing two or more kinds of copolymers which are to constitute a polycarboxylic acid copolymer, and then mixing those copolymers, and (ii) a process of preparing two or more kinds of copolymers having different acid value, or having a weight average molecular weight of 20,000 or less in a series of polymerization steps by, for example, changing a ratio of monomers during polymerization are preferable. Preferable is a process of (i).

As the production method of copolymer mentioned above, for example, any polymerization method can be used, such as water solution polymerization, polymerization in organic solvent, emulsion polymerizion or bulk polymerization using the monomer components and a polymerization initiator. For example, suitable as the above polymerization initiator, are persulfate salts such as ammonium persulfate, sodium persulfate and potassium persulfate; hydrogen peroxide; azo compounds such as azobis-2-methylpropionamidine hydrochloride and azoisobutyronitrile; peroxides such as benzoyl peroxide, lauroyl peroxide and cumene hydroperoxide; and so forth. Further, as the promoter, reducing agents such as sodium hydrogensulfite, sodium sulfite, Mohr's salt, sodium pyrobisulfite, formaldehyde sodium sulfoxylate, ascorbic acid and erythorbic acid; and amine compounds such as ethylenediamine, sodium ethylenediaminetetraacetate and glycine, etc. can be used in combination. These polymerization initiators and promoters may be used singly or two or more species may be used in combination.

In the above method of copolymerization, a chain transfer agent may be used according to need. Usable as such chain transfer agent are one or two or more species of those known in the art.

Suitable as the hydrophobic chain transfer agent are thiol compounds having a hydrocarbon group containing not less than 3 carbon atoms or compounds whose solubility in water at 25° C. is not more than 10%. For example, suitable are thiol chain transfer agents such as butanethiol, octanethiol, decanethiol, dodecanethiol, hexadecanethiol, octadecanethiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, decanetrithiol, and dodecyl mercaptan; halides such as carbon tetrachloride, carbon tetrabromide, methylene chloride, bromoform, and bromotrichloroethane; unsaturated hydrocarbon compounds such as α-methylstyrene dimer, α-terpinene, γ-terpinene, dipentene, and terpinolene; and the like. These may be used one or two or more species may be used in combination.

Also suitable as hydrophilic chain transfer agents are thiol chain transfer agents such as mercaptoethanol, thioglycerol, thioglycolic acid, mercaptopropionic acid, 2-mercaptopropionic acid, 3-mercaptopropionic acid, thiomalic acid, and 2-mercaptoethanesulfonic acid; primary alcohols such as 2-aminopropane-1-ol; secondary alcohols such as isopropanol; phosphorous acid, hypophosphorous acid and salts thereof (e.g. sodium hypophosphite, potassium hypophosphite), sulfurous acid, hydrosulfurous acid, dithionous acid, metabisulfurous acid, and salts thereof (e.g. sodium sulfite, sodium hydrogen sulfite, sodium dithionite, sodium metabisulfite, potassium sulfite, potassium hydrogen sulfite, potassium dithionite, potassium metabisulfite), and like lower oxides and salts thereof. These may be used one or two or more species.

As for the method of adding the above chain transfer agent to the reaction vessel, such a continuous charging method as dripping and divided charging can be applied. The chain transfer agent may be introduced singly into the reaction vessel, or it may be admixed in advance with the monomer or solvent.

The above method of polymerization may be carried out either batchwise or continuously. As the solvent which is used where necessary in the step of polymerization, any of known ones may be used and suitable are water; alcohols such as methyl alcohol, ethyl alcohol and isopropyl alcohol; aromatic or aliphatic hydrocarbons such as benzene, toluene, xylene, cyclohexane and n-heptane; esters such as ethyl acetate; and ketones such as acetone and methyl ethyl ketone. These may be used one or two or more species may be used in combination. Among them, one or two or more solvents selected from the group consisting of water and lower alcohols containing 1 to 4 carbon atoms are preferably used from the viewpoint of solubility of the monomer and the obtained copolymer.

As for the method of adding the monomer polymerization initiator, etc. to the reaction vessel in the above-mentioned method of polymerization, suitable are the method comprising charging the reaction vessel with all monomer and then adding the polymerization initiator thereto to conduct copolymerization; the method comprising charging the reaction vessel with some of monomer and then adding the polymerization initiator and residual monomer components thereto to conduct polymerization; and the method comprising charging the reaction vessel with the polymerization solvent and then adding the whole amount of the monomers and polymerization initiator thereto are suitable. Among such methods, the method comprising carrying out the polymerization by adding dropwise the polymerization initiator and monomers successively to the reaction vessel is preferred since the molecular weight distribution of the product copolymer can be made narrow (sharp) and the cement dispersibility for increasing the fluidity of cement compositions and the like can be improved thereby. Furthermore, the copolymerization reaction is preferably carried out with maintaining the density of solvent in the reaction vessel during the polymerization to not more than 80% since the preservation stability of the obtained polymer is more improved by the improvement of the copolymerizability of the monomer components. More preferably, it is not more than 70%, still more preferably not more than 60%. Furthermore, the copolymerization reaction is preferably carried out with maintaining the density of solvent in the reaction vessel during the polymerization to not more than 50%. More preferably, it is not more than 40%, still more preferably not more than 30%.

In the above method of polymerization, the polymerization temperature and other polymerization conditions are appropriately selected according to the polymerization method, solvent, polymerization initiator, and chain transfer agent employed. It is generally preferred that the polymerization temperature be not lower than 0° C. and not higher than 150° C. More preferably, 40 to 120° C., still more preferably 50 to 100° C., especially preferably 60 to 85° C.

The polymer obtained by the above method of copolymerization as such can be used as the main component of cement admixtures. Where necessary, it may be used after further neutralization with an alkaline substance. Preferably used as the alkaline substance are inorganic salts such as monovalent and divalent metal hydroxides, chlorides and carbonates; ammonia; and organic amines, etc.

The cement admixture of the present invention may contain, as an anti-foaming agent, a polyoxyalkylene compound containing at least one nitrogen atom and, at the same time, having an oxyethylene group and an oxyalkylene group having 3 or more carbon atoms in a molecule, and containing an aliphatic hydrocarbon structure in which 5 or more carbon atoms are bound successively. A cement admixture containing such the anti-foaming agent is also one of preferable embodiments of the present invention. One or more kind(s) of such the anti-foaming agents can be used.

The polyoxyalkylene compound may be used by neutralizing a nitrogen atom with an inorganic acid such as hydrochloric acid, sulfuric acid and nitric acid, or an acidic substance such as acetic acid, propionic acid and (meth)acrylic acid. By blending such the polyoxyalkylene compound with the cement admixture of the present invention, water-solubility of a copolymer in the cement admixture is improved, and storage stability of an aqueous medium solution of a blend of an polyoxyalkynele compound and a copolymer becomes much better.

It is preferable that the aforementioned oxyethylene group and an oxyalkylene group having 3 or more carbon atoms are present in a polyoxyalkylene compound as a polyoxyalkylene group in the added state and, when a polyoxyalkylene compound has a plurality of polyoxyalkylene groups, these may be the same or different.

A carbon number of an oxyalkylene group having 3 or more carbon atoms is preferably 8 or less, more preferably 6 or less, and still more preferably 4 or less. In addition, an addition form of an oxyalkylene group in a form in which two or more kinds of alkylene oxides, that is, ethylene oxide, and alkylene oxide having 3 or more carbon atoms are added, may be any of random addition, block addition and alternate addition. A preferable form is such that oxyethylene group-oxyalkylene group having 3 or more carbon atoms is added in a block manner.

The aforementioned polyoxyalkylene compound has at least one aliphatic hydrocarbon structure in which 5 or more carbon atoms are bound successively. Examples of the aliphatic hydrocarbon structure in which 5 or more carbon atoms are bound successively, include an aliphatic hydrocarbon group having a structure in which 5 or more carbon atoms are bound successively, and an oxyalkylene group having a structure in which 5 or more carbon atoms are bound successively and, as long as such the structure is present in a molecule, the structure is not particularly limited. For example, an aliphatic hydrocarbon structure in which 5 or more carbon atoms are successively bound in an oxyalkylene group having 3 or more carbon atoms may be contained, or alternatively, an aliphatic hydrocarbon structure in which 5 or more carbon atoms are successively bound in a terminal hydrocarbon may be contained. In addition, as such the aliphatic hydrocarbon structure, it is preferable that a structure in which 8 or more, more preferably 10 or more, and still more preferably more than 12 carbon atoms are bound successive. When a polyoxyalkylene compound having an aliphatic hydrocarbon structure having 12 or more carbon atoms is used, quality of the air in a concrete composition can be made to be better. In addition, 30 or less carbon atoms are preferable. 22 or less is more preferable.

It is preferable to use, as the polyoxyalkylene compound, a compound represented by the following formula (10):

$$Z-[(AO)_s-R^{17}]_t \qquad (10)$$

(wherein Z represents a compound residue having active hydrogen, $R^{17}$s are the same or different, and represent a hydrogen atom, a hydrocarbon group, $-Y-NR^{18}R^{19}$, $-COR^{20}$ or $-CH_2CH_2NHCO-R^{21}$, Y represents an alkylene group having 1 to 10 carbon atom(s), $R^{18}$ and $R^{19}$ are the same or different, and represent a hydrogen atom or a hydrocarbon group having 1 to 30 carbon atom(s), $R^{20}$ and $R^{21}$ represent a hydrocarbon group having 1 to 30 carbon atom(s), or a group having at least one carboxyl group or sulfonyl group or a salt thereof, AOs are the same or different, and represent an oxyalkylene group having 2 to 18 carbon atoms, "s"s are the same or different, and represent an average molar number of addition of an oxyalkylene group, and is 1 to 300, t is 1 to 300 and, regarding the total molar number of addition of the oxyethylene group in the oxyalkylene group as u and a total molar number of addition of an oxyalkylene group having 3 or more carbon atoms to be v, a relationship of 0.1<u/(u+v)<0.9, 1<u+v<300 is satisfied). In addition, in a polyoxyalkylene compound, represented by the formula (10), a group represented by Z and/or a group represented by $R^{17}$ has a nitrogen atom.

In the formula (10), Z represents a compound residue having active hydrogen. A compound residue having active hydrogen means a group having a structure obtained by removing active hydrogen from a compound having active hydrogen, and is not particularly limited to a group which is formed by a reaction with a compound having active hydrogen. In addition, in a polyoxyalkylene compound, a compound residue having active hydrogen may be one or more kind(s). As such the group, a residue of an alcohol having a structure in which active hydrogen is removed from a hydroxyl group of an alcohol, a residue of carboxylic acid having a structure in which active hydrogen is removed from a carboxyl group of carboxylic acid, a residue of amine having a structure in which active hydrogen is removed from an amino group of amine, a residue of imine having a structure in which active hydrogen is removed from an imino group of imine, and a residue having a structure in which active hydrogen is removed from a thiol group of thiol are preferable. Among them, a residue of alcohol, and a residue of amine or imine are preferable. A form of a compound residue having active hydrogen may be any of chain-like, branched, and three-dimensionally crosslinked structures.

Regarding a preferable embodiment of the aforementioned compound residue having active hydrogen, as a residue of alcohol, a residue having a structure in which active hydrogen is removed from a monohydric alcohol or a polyhydric alcohol such as trimethylolpropane, pentaerythritol, polyglycerin and sorbitol is preferable, as a residue of amine, a residue having a structure in which active hydrogen is removed from monovalent amine or polyvalent amine is preferable and, as a residue of imine, a residue having a structure in which active hydrogen is removed from diethyleneimine or polyethyleneimine is preferable.

In the formula (10), $R^{17}$s are the same or different, and represent a hydrogen atom, a hydrocarbon group, $-Y-NR^{18}R^{19}$, $-COR^{20}$ or $-CH_2CH_2NHCO-R^{21}$. As a hydrocarbon group, a straight or branched alkyl group having 1 to 30 carbon atom(s); an aromatic group having a benzene ring which have 6 to 30 carbon atoms such as a phenyl group, an alkyl phenyl group, a phenyl alkyl group, a phenyl group substituted with an (alkyl)phenyl group, and a naphthyl group; an alkenyl group having 2 to 30 carbon atoms; an alkynyl group having 2 to 30 carbon atoms are preferable. In addition, a carbon number of a hydrocarbon group has 1 or more carbon atom(s), and in order that a polyoxyalkylene compound has high anti-foaming performance, a carbon number is preferably 2 or more, more preferably 5 or more, and still more preferably more than 12. In addition, a carbon number is preferably 30 or less, more preferably 22 or less, and still more preferably 18 or less. Moreover, among hydrocarbon groups, a straight or branched alkyl group, and alkenyl group are particularly preferable.

The Y represents an alkylene group having 1 to 10 carbon atom(s), and a carbon number is preferably 2 or more, and preferably 8 or less. The $R^{18}$ and $R^{19}$ represent a hydrogen atom or a hydrocarbon group having 1 to 30 carbon atom(s) and, when there is no aliphatic hydrocarbon structure in which 5 or more carbon atoms are bound to Z or AO in the formula (10), a carbon number of a hydrocarbon group in $R^{18}$ and $R^{19}$ is preferably 5 or more, more preferably 8 or more, and still more preferably 10 or more. In addition, a carbon number is and still more preferably more than 12. In addition, a carbon number is preferably 22 or less. Conversely, when there is an aliphatic hydrocarbon structure in which 5 or more carbon atoms are successively bound to Z or AO, $R^{18}$ and $R^{19}$ are preferably a hydrogen atom. $R^{20}$ and $R^{21}$ represent a hydrocarbon group having 1 to 30 carbon atom(s), or a group having at least one carboxyl group or sulfonyl group or a salt thereof and, when there is no aliphatic hydrocarbon structure in which 5 or more carbon atoms are successively bound to Z or AO in the formula (10), a hydrocarbon group having 5 or more carbon atoms is preferable. In contrast, when there is an aliphatic hydrocarbon structure in which 5 or more carbon atoms are successively bound to Z or AO, a group having at least one carboxyl group or sulfonyl group or a salt thereof is preferable. Among hydrocarbon groups, a straight or branched alkyl group, and alkenyl group are particularly preferable.

The AO represents an oxyalkylene group having 2 to 18 carbon atoms, and a carbon number is preferably 8 or less, more preferably 6 or less, and still more preferably 4 or less. An addition embodiment of an oxyethylene group and an oxyalkylene group having 3 or more carbon atoms may be any of random manner, block manner and alternate manner. A more preferable embodiment is block manner. In addition, the u and v represent a total molar number of addition of an oxyethylene group and a total molar number of addition of an oxyalkylene group having 3 or more carbon atoms, respectively, and it is preferable to satisfy a relationship of 0.1<u/(u+v)<0.9, 1<u+v<300. (u+v) is more preferably more than 5, and still more preferably more than 10. In addition, (u+v) is preferably less than 200, more preferably less than 150, and still more preferably less than 100, particularly preferably less than 80, most preferably less than 50. In the formula (10), an average molar number of addition means an average value of a mole number of an oxyalkylene group which is added per 1 mole of the same unit among units represented by $[(AO)_s-R^{17}]$.

In addition, it is preferable that u/(u+v) which is a ratio of a total molar number of addition u of an oxyethylene group relative to a total molar number of addition (u+v) of alkylene oxide satisfies a relationship of 0.1<u/(u+v)<0.9. When the ratio is 0.9 or more, there is a possibility that hydrophilicity becomes too strong, and anti-foaming property becomes not sufficient in some cases. When the ratio is 0.1 or less, there is a possibility that anti-foaming property can not be endured. In either case, a strength of a hardening product is reduced. A value of u/(u+v) is more preferably more than 0.15, and still more preferably more than 0.2, particularly preferably more than 0.3. In addition, the value is more preferably less than 0.8, and still more preferably less than 0.7, particularly preferably less than 0.55, most preferably less than 0.5.

In addition, it is preferable that (u+v) satisfies a relationship of 1<u+v<300. (u+v) is more preferably more than 5, and still more preferably more than 10. In addition, (u+v) is preferably less than 200, more preferably less than 150, and still more preferably less than 100, particularly preferably less than 80, most preferably less than 50.

The t is 1 to 300, and is preferably 200 or less, more preferably 100 or less. When t is 2 or more, that is, when a plurality of groups represented by —[(AO)$_s$—R$^{17}$] are bound to Z, groups represented by —[(AO)$_s$—R$^{17}$] may be the same or different.

Since a polyoxyalkylene compound in the formula (10) has at least one aliphalic hydrocarbon structure in which 5 or more carbon atoms are successively bound in a molecule, there is, in the formula (10), an aliphalic hydrocarbon structure in which 5 ore more successive carbon atoms are bound, in at least one of structures represented by R$^{17}$, Z, R$^{17}$-AO and AO constituting a polyoxyalkylene compound. As such the aliphatic hydrocarbon structure, a structure in which 10 or more hydrocarbon atoms are bound successively, is preferable. In addition, 30 or less is preferable. 22 or less is more preferable.

A molecular weight of a polyoxyalkylene compound in the present invention is preferably 10,000 or less, more preferably 5,000 or less, and preferably 100 or more, more preferably 200 or more.

As a compound represented by the formula (10), a primary amine having a straight or branched alkyl group having 1 to 30 carbon atom(s) such as (di)methylamine, (di)ethylamine, (di)propylamine, (di)butylamine, (di)pentylamine, (di)hexylamine, (di)heptylamine, (di)octylamine, (di)nonylamine, (di)decaamine, (di)undecaamine, (di)dodecaamine, (di)tetradecaamine, (di)pentadecaamine, (di)hexadecaamine, (di) heptadecaamine, (di)octadecaamine, (di)nonadecaamine, and (di)icosaamine; a secondary amine having the same kinds of alkyl groups or different kinds of alkyl groups; a primary amine having a straight or branched alkyl group having 1 to 30 carbon atom(s) such as a primary amine derived from fatty acid obtained from a palm oil, a primary amine derived from oleic acid, a primary amine derived from fatty acid obtained from a soybean oil, a primary amine derived from fatty acid obtained from beef tallow; and a primary amine derived from fatty acid obtained from hardened tallow and in which a different kind of an alkyl group is mixed; a secondary amine having a straight or branched alkyl group having 1 to 30 carbon atom(s) such as a secondary amine derived from fatty acid obtained from a palm oil, a secondary amine derived from oleic acid, a secondary amine derived from fatty acid obtained from a soybean oil, a secondary amine derived from fatty acid obtained from beef tallow, and a secondary amine derived from fatty acid obtained from hardened tallow and in which a different kind of an alkyl group is mixed; a primary or secondary amine having an aromatic group having a benzene ring and having 6 to 30 carbon atoms such as an aromatic group having a phenyl group, an alkylphenyl group, a phenylalkyl group, a phenyl group substituted with an (alkyl)phenyl group, and a naphthyl group, an alkenyl group having 2 to 30 carbon atoms, or an alkynyl group having 2 to 30 carbon atoms; an adduct obtained by adding ethylene oxide and alkylene oxide having 3 to 18 carbon atoms to amines such as alkanol amines such as monoethanolamine, diethanolamine, and triethanolamine are preferable.

In addition, as a compound having two or more nitrogen atoms among the compounds represented by the formula (10), ethylene oxide adducts and alkylene oxide adducts having 3 to 18 carbon atoms of amidoamines obtained by dehydration-condensing polyalkylene polyamines such as ethylenediamine, propylenediamine, diethylenetriamine, triethylenetetramine, dipropylenetriamine, and tetrapropylenepentamine, and fatty acids such as acetic acid, propionic acid, butyric acid, valeric acid, lauric acid, stearic acid, oleic acid, fatty acid obtained from a palm oil, fatty acid obtained from a soybean oil, fatty acid obtained from beef tallow, and fatty acid obtained from hardened tallow; ethylene oxide adducts and alkylene oxide adducts having 3 to 18 carbon atoms of imidazolines obtained by dehydration-condensing polyalkylenepolyamines such as ethylenediamine, propylenediamine, diethylenetriamine, triethylenetetramine, dipropylenetriamine, and tetrapropylenepentamine, and fatty acids such as acetic acid, propionic acid, butyric acid, valeric acid, lauric acid, stearic acid, oleic acid, fatty acid obtained from a palm oil, fatty acid obtained from a soybean oil, fatty acid obtained from beef tallow, and fatty acid obtained from hardened tallow to obtain amidoamines, and further dehydrated to obtained amidoamines; ethylene oxide adducts and alkylene oxide adducts having 3 to 18 carbon atoms of polyalkylenepolyamines such as ethylenediamine, propylenediamine, diethylenetriamine, triethylenetetramine, dipropylenetriamine, and tetrapropylenepentamine; ethylene oxide adducts and alkylene oxide adducts having 3 to 18 carbon atoms of polyalkylenepolyamines such as ethylenediamine, propylenediamine, diethylenetriamine, triethylenetetramine, dipropylenetriamine, and tetrapropylenepentamine which are modified with a hydrocarbon group having 1 to 30 carbon atom(s); ethylene oxide adducts and alkylene oxide adducts having 3 to 18 carbon atoms of polyalkyleneimines such as polyethyleneimine, and polypropyleneimine obtained by polymerizing alkyleneimine such as ethyleneimine, propyleneimine; ethylene oxide and alkylene oxide having 3 to 18 carbon atoms adducts of polyalkyleneimines such as polyethyleneimine, and polypropyleneimine obtained by polymerizing alkyleneimine such as ethyleneimine, and propyleneimine which are modified with a hydrocarbon group having 1 to 30 carbon atom(s); ethylene oxide and alkylene oxide having 3 to 18 carbon atoms adducts of alkylaminopropylamines obtained by adding acrylonitrile to primary amine or secondary amine having a hydrocarbon group having 1 to 30 carbon atom(s), and then reducing the adduct, are preferable.

As a nitrogen atom-containing polyoxyalkylene compound, the following compounds are also preferable.

Amines obtained by adding ethylene oxide and alkylene oxide having 3 to 18 carbon atoms to monohydric alcohols having a hydrocarbon group having 1 to 30 carbon atom(s) to obtain polyoxyalkylenes, and introducing an amino group therein; amines obtained by introducing an amino group into polyoxyethylene polyoxyalkylene having hydroxyl groups at both ends; amines obtained by adding ethylene oxide and alkylene oxide having 3 to 18 carbon atoms to a polyhydric alcohol having 3 or more hydroxyl groups in a molecule to obtain polyoxyalkylenes, and introducing an amino group therein; amines obtained by adding ethylene oxide and alkylene oxide having 3 to 18 carbon atoms to alcohols having an acetylene group in a molecule to obtain polyoxyalkylenes, and introducing an amino group therein.

There are contemplated a variety of methods of introducing an amino group, but a method of converting a hydroxy group itself into an amino group with various amination reagents, and a method of adding alkyleneimine such as ethyleneimine and propyleneimine to a hydroxy group are preferable.

As a monohydric alcohol having a hydrocarbon group having 1 to 30 carbon atom(s), a straight or branched saturated alcohol such as methanol, ethanol, propanol, isopropanol, butanol, pentanol, hexanol, octanol, lauryl alcohol, cetyl alcohol, stearyl alcohol, a straight or branched alcohol having 12 to 14 carbon atoms; an unsaturated alcohol such as allyl alcohol, methallyl alcohol, 3-methyl-3-buten-1-ol, 3-methyl-2-buten-1-ol, 2-methyl-3-buten-2-ol, oleyl alcohol; an aromatic alcohol such as phenol, nonyl phenol, benzyl alcohol are preferable.

As polyoxyethylene polyoxyalkylenes having a hydroxy group on both ends, AB type block type such as polyoxyethylene polyoxypropylene, and polyoxyethylene polyoxybutylene; ABA block type such as polyoxyethylene polyoxypropylene polyoxyethylene, polyoxypropylene polyoxyethylene polyoxypropylene, and polyoxyethylene polyoxybutylene polyoxyethylene are preferable.

As the polyhydric alcohol having 3 or more hydroxyl groups in a molecule, trimethylolpropane, pentaerythritol, polyglycerin and sorbitol are preferable.

As the alcohols having an acetylene group in a molecule, 2,4,7,9-tetramethyl-5-decyn-4,7-diol, 2,5-dimethyl-3-hexyn-2,5-diol, and 3-methyl-1-butyn-3-ol are preferable.

When no aliphatic hydrocarbon structure in which 5 or more carbon atoms are successively bound in a molecule is contained in the aforementioned polyoxyalkylene compound, an aliphatic hydrocarbon structure may be appropriately introduced by partially adding alkylene oxide having 5 to more carbon atoms, or reacting with alkyl halide having 5 to more carbon atoms during synthesis or after synthesis.

In addition, a compound obtained by further adding alkylene oxides such as ethylene oxide or alkyleneimines such as ethyleneimine to a terminal functional group of the aforementioned polyoxyalkylene compound may be also used as a polyoxyalkylene compound.

Further, a compound obtained by reacting a terminal functional group of the aforementioned polyoxyalkylene compound with an acid anhydride such as acetic anhydride and butyric anhydride may be also used as a polyoxyalkylene compound in the present invention.

In addition, as a polyoxyalkylene compound, the following compounds are also preferable.

Compounds obtained by esterification-binding the aforementioned polyoxyalkylene compound and a compound having two or more carboxyl groups while leaving at least one carboxyl group; compounds obtained by esterification-binding the aforementioned polyoxyalkylene compound and a compound having a carboxyl group and a sulfonyl group while leaving at least one sulfonyl group; compounds obtained by amido-binding the aforementioned polyoxyalkylene compound and a compound having two or more carboxyl groups while leaving at least one carboxyl group; compounds obtained by amido-binding the aforementioned polyoxyalkylene compound and a compound having a carboxyl group and a sulfonyl group while leaving at least one sulfonyl group.

In such the polyoxyalkylene compound, a remaining carboxyl group or sulfonyl group may be various metal salts such as a sodium salt and a calcium salt which are neutralized with a base such as sodium hydroxide and calcium hydroxide, an ammonium salt, or an amine salt.

As the aforementioned compound having two or more carboxyl groups, unsaturated dicarboxylic acids such as maleic acid, fumaric acid, phthalic acid and itaconic acid, and a metal salt, an ammonium salt, an amine salt thereof; saturated dicarboxylic acids such as succinic acid, malonic acid, glutaric acid and adipic acid, and a metal salt, an ammonium salt, and an amine salt thereof; a low-molecular polymer of unsaturated monocarboxylic acid or unsaturated dicarboxylic acid such as an acrylic acid oligomer, a methacrylic acid oligomer and a maleic acid oligomer, and a metal salt, an ammonium salt and an amine salt thereof are preferable.

The aforementioned polyoxyalkylene compound can be obtained, for example, by reacting a polyoxyalkylene compound having a hydroxy group at an end and acid anhydride such as maleic anhydride and succinic anhydride without a solvent or in a suitable solvent. Thereupon, it is preferable to use a suitable base catalyst. Alternatively, the polyoxyalkylene compound can be also obtained by esterification by dehydration-reacting a polyoxyalkylene compound having a hydroxy group at an end and carboxylic acid, or a transesterification reaction of a polyoxyalkylene compound having a hydroxy group at an end and an ester compound.

In the present invention, among the polyoxyalkylene compounds represented by the formula (10), when $R^{17}$ is a hydrogen atom, or when Z has —OH or —$NH_2$, an unsaturated monomer having anti-foaming property can be synthesized by esterification and amidation with unsaturated carboxylic acid such as (meth)acrylic acid and maleic acid. By copolymerizing this unsaturated monomer having anti-foaming property with the aforementioned monomer component, an anti-foaming component can be incorporated into a polymer skeleton. A cement admixture containing a polymer in which such the anti-foaming component is incorporated into the cement admixture of the present invention is also one of embodiments of the present invention.

When the cement admixture of the present invention containing the aforementioned polyoxyalkylene compound is used in a cement composition, a ratio of a polyoxyalkylene compound to be blended is preferably 0.0001% by weight or more, and preferably 1.0% by weight or less of cement weight. When the blending ratio is smaller than 0.0001% by weight, there is a possibility that performance is insufficient. Even when an amount exceeding 1.0% by weight is used, there is a possibility that the effect becomes substantially plateau, and this is also disadvantageous from economical point of view. The blending ratio is more preferably 0.0005% by weight or more, and still more preferably 0.001% by weight or more. And, the blending ratio is preferably 0.5% by weight or less, and still more preferably 0.1% by weight or less. An amount corresponding to such the ratio may be added. By this addition, various preferable effects such as reduction in a unit water amount, increase in a strength, and improvement in durability are exerted.

The cement admixture of the present invention is preferably in a form of an aqueous solution from a viewpoint of handling. In addition, the cement admixture of the present invention may contain other additive, or when the cement admixture of the present invention is mixed with cement, other additive may be added. As the other additive, the known cement additives may be used. For example, one or more kind(s) of the following additives can be used.

(1) Water-soluble macromolecular substances; unsaturated carboxylic acid polymers such as polyacrylic acid (sodium salt), polymethacrylic acid (sodium salt), polymaleic acid (sodium salt) and acrylic acid-maleic acid copolymer sodium salt; polyoxyethylene and/or polyoxypropylene polymers or copolymers thereof, such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation, such as yeast glucans, xanthan gum, β-1,3-glucans (which may be straight chained or branched; e.g. curdlan, paramylum, pachyman, scleroglucan, laminaran); polyacrylamide; polyvinyl alcohol; starch; starch phosphate; sodium alginate; gelatin; amino-containing acrylic acid copolymers and quaternization products derived therefrom; and the like;

(2) Polymer emulsions; copolymers of various vinyl monomers such as alkyl(meth)acrylates; and the like;

(3) Retarders; oxycarboxylic acids (or salts thereof) and inorganic or organic salts, such as gluconic acid, glucoheptonic acid, arabonic acid, malic acid and citric acid, and sodium, potassium, calcium, magnesium, ammonium and triethanolamine salts thereof; saccharides, for example monosaccharides, disaccharides, trisaccharides and like oligosaccharides, such as glucose, fructose, galactose, saccharose, xylose, apiose, ribose and isomerized saccharide, oligosaccharides such as dextrin, polysaccharides such as dextran, molasses and like mixtures containing these; sugar alcohols such as sorbitol; magnesium fluorosilicate; phosphoric acid and salts thereof or borate esters; aminocarboxylic acids and salts thereof; alkali-soluble proteins; humic acid; tannic acid; phenols; polyhydric alcohols such as glycerol; phosphonic acids and derivatives thereof, such as aminotri (methylenephosphonic acid), 1-hydroxyethylidene-1,1-diphosphonic acid, ethylenediaminetetra(methylenephosphonic acid), diethylenetriaminepenta (methylenephosphonic acid) and alkali metal salts and alkaline earth metal salts of these; and the like;

(4) High-early-strength agents or accelerators; soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate; and the like;

(5) Mineral oil antifoaming agents; kerosene, liquid paraffin, etc.;

(6) Fat or oil antifoaming agents; animal/vegetable oils, sesame oil, castor oil, alkylene oxide adducts derived from these, and the like;

(7) Fatty acid antifoaming agents; oleic acid, stearic acid, alkylene oxide adducts derived from these, and the like;

(8) Fatty acid ester antifoaming agents; glycerin monoricinolate, alkenylsuccinic acid derivatives, sorbitol monolaurate, sorbitol trioleate, natural waxes, etc.;

(9) Oxyalkylene antifoaming agents; polyoxyalkylenes such as (poly) oxyethylene-(poly) oxypropylene adducts; (poly) oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of higher alcohols containing 12 to 14 carbon atoms; (poly)oxyalkylene (alkyl)aryl ethers such as polyoxypropylene phenyl ether and polyoxyethylene nonylphenyl ether; acetylene ethers derived from acetylene alcohol by addition polymerization of an alkylene oxide, such as 2,4,7,9-tetramethyl-5-decyne-4,7-diol, 2,5-dimethyl-3-hexyne-2,5-diol and 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl)ether sulfate ester salts such as sodium polyoxypropylenemethyl ether sulfate and sodium polyoxyethylene dodecylphenol ether sulfate; (poly)oxyalkylenealkyl phosphate esters such as (poly) oxyethylenestearyl phosphate; (poly)oxyalkylenealkylamines such as polyoxyethylenelaurylamine; polyoxyalkyleneamides; etc.;

(10) Alcohol antifoaming agents; octyl alcohol, hexadecyl alcohol, acetylene alcohol, glycols, etc.;

(11) Amide antifoaming agents; acrylate polyamines etc.;

(12) Phosphate ester antifoaming agents; tributyl phosphate, sodium octyl phosphate, etc.;

(13) Metal soap antifoaming agents; aluminum stearate, calcium oleate, etc.;

(14) Silicone antifoaming agents; dimethylsilicone oils, silicone pastes, silicone emulsions, organic modified polysiloxanes (polyorganosiloxanes such as dimethylpolysiloxane), fluorosilicone oils, etc.;

(15) AE (air-entraining) agents; resin soaps, saturated or unsaturated fatty acids, sodium hydroxystearate, lauryl sulfate, ABS (alkylbenzenesulfonates), LAS (linear alkylbenzenesulfonates), alkanesulfonates, polyoxyethylene alkyl(phenyl)ethers, polyoxyethylene alkyl(phenyl)ether sulfates and salts thereof, polyoxyethylene alkyl(phenyl)ether phosphates and salts thereof, proteinous materials, alkenylsulfosuccinic acids, α-olefinsulfonates, etc.;

(16) Other surfactants; polyalkylene oxide derivatives produced by addition of not less than 10 moles of an alkylene oxide, such as ethylene oxide and/or propylene oxide to monohydric aliphatic alcohol containing 6 to 30 carbon atoms, such as octadecyl alcohol or stearyl alcohol, a monohydric alicyclic alcohol containing 6 to 30 carbon atoms, such as abietyl alcohol, a monomercaptan containing 6 to 30 carbon atoms, such as dodecyl mercaptan, an alkylphenol containing 6 to 30 carbon atoms, such as nonylphenol, an amine containing 6 to 30 carbon atoms, such as dodecylamine, or a carboxylic acid containing 6 to 30 carbon atoms, such as lauric acid or stearic acid; alkyl diphenyl ether sulfonate salts containing two sulfo-containing phenyl groups, which may have an alkyl or alkoxy group as a substituent, bound together by ether bonding; various anionic surfactants, various cationic surfactants such as alkylamine acetates and alkyltrimethylammonium chlorides; various nonionic surfactants; various amphoteric surfactants; and the like;

(17) Water-proof agents; fatty acids (salts), fatty acid esters, fats and oils, silicones, paraffins, asphalts, waxes, etc.;

(18) Corrosion inhibitors; nitrite salts, phosphate salts, zinc oxide, etc.;

(19) Crack inhibitors; polyoxyalkyl ethers; alkanediols such as 2-methyl-2,4-pentanediol; etc.;

(20) Expansive additives; ettringite materials, coals, etc.

As other known cement additives (admixtures), These can be used that cement wetting agents, thickening agents, segregation reducing agents, flocculants, drying shrinkage reduceing agents, agents to increase strength, self-leveling agents, corrosion inhibitors, color difference agents, antifungal agents, blast-furnace slag, fly ash, cinder ash, clinker ash, husk ash, silica fume, silica powder, gypsum and so forth.

Furthermore, the cement admixture of the present invention can be used in combinations with any of those cement dispersants which are well known in the art. For example, as one or two or more species in the following can be used.

ligninsulfonates; polyol derivatives; naphthalenesulfonic acid-formaline condensates; melaminesulfonic acid-formaline condensates; polystyrenesulfonic acid salts; aminosulfonic acid compounds such as aminoaryl sulfonic acid-phenol-formaldehyde condensates as described in Japanese Kokai Publication Hei-01-113419; cement dispersants comprising, as component (a), a copolymer of a polyalkylene glycol mono(meth)acrylate compound and a (meth)acrylic acid compound and/or a salt of said copolymer, as component (b), a copolymer of a polyalkylene glycol mono(meth)allyl ether compound and maleic anhydride and/or a hydrolyzate of said copolymer and/or a salt thereof and, as component (c), a copolymer of a polyalkylene glycol mono(meth)allyl ether compound and a maleic acid ester of a polyalkylene glycol compound, and/or a salt thereof, as described in Japanese Kokai Publication Hei-07-267705; concrete admixtures comprising, as component A, a copolymer of a polyalkylene glycol (meth)acrylate and (meth)acrylic acid (or a salt thereof), as component B, a specific polyethylene glycol-polypropylene glycol compound and, as component C, a specific surfactant, as described in JP 2508113; copolymers of polyethylene(propylene) glycol (meth)acrylate or polyethylene (propylene) glycol mono(meth)allyl ether, (meth)allylsulfonic acid (or a salt thereof) and (meth)acrylic acid (or a salt thereof), as described in Japanese Kokai Publication Sho-62-216950;
copolymers of polyethylene(propylene) glycol (meth)acrylate, (meth)allylsulfonic acid (or a salt thereof) and (meth) acrylic acid (or a salt thereof), as described in Japanese Kokai Publication Hei-01-226757; copolymers of polyethylene (propylene) glycol (meth)acrylate, (meth)allylsulfonic acid (or a salt thereof) or p-(meth)allyloxybenzenesulfonic acid (or a salt thereof) and (meth)acrylic acid (or a salt thereof), as described in Japanese Kokoku Publication Hei-05-36377; copolymers of polyethylene glycol mono(meth)allyl ether and maleic acid (or a salt thereof), as described in Japanese Kokai Publication Hei-04-149056; copolymers of polyethylene glycol (meth)acrylate, (meth)allylsulfonic acid (or a salt thereof), (meth)acrylic acid (or a salt thereof), an alkanediol mono(meth)acrylate, a polyalkylene glycol mono(meth) acrylate and an α,β-unsaturated monomer having an amide group within the molecule, as described in Japanese Kokai Publication Hei-05-170501; copolymers of polyethylene glycol mono(meth)allyl ether, polyethylene glycol mono(meth) acrylate, an alkyl(meth)acrylate, (meth)acrylic acid (or a salt thereof) and (meth)allylsulfonic acid (or a salt thereof) or p-(meth)allyloxybenzenesulfonic acid (or a salt thereof), as described in Japanese Kokai Publication Hei-06-191918; copolymers of an alkoxypolyalkylene glycol monoallyl ether and maleic anhydride, or hydrolyzates thereof, or salts thereof, as described in Japanese Kokai Publication Hei-05-43288; copolymers of polyethylene glycol monoallyl ether, maleic acid and a monomer copolymerizable with these monomers, or salts thereof, or esters thereof, as described in Japanese Kokoku Publication Sho-58-38380;
copolymers of a polyalkylene glycol mono(meth)acrylate monomer, a (meth)acrylic acid monomer and a monomer copolymerizable with these monomers, as described in Japanese Kokoku Publication Sho-59-18338; copolymers of a (meth)acrylic acid ester having a sulfonic acid group and a monomer copolymerizable with these as necessary, or salts thereof, as described in Japanese Kokai Publication Sho-62-119147; esterification reaction products from a copolymer of an alkoxypolyalkylene glycol monoallyl ether and maleic anhydride and an alkenyl-terminated polyoxyalkylene derivative, as described in Japanese Kokai Publication Hei-06-271347; esterification reaction products from a copolymer of an alkoxypolyalkylene glycol monoallyl ether and maleic anhydride and a hydroxy-terminated polyoxyalkylene derivative, as described in Japanese Kokai Publication Hei-06-298555; copolymers of alkenyl ether monomer obtained by addition of an ethylene oxide to a specific unsaturated alcohol, such as 3-methyl-3-buten-1-ol, an unsaturated carboxylic acid monomer and a monomer copolymerizable with these, or salts thereof as described in Japanese Kokai Publication Sho-62-68806 or like polycarboxylic acids (or salts thereof).

A polycarboxylic acid copolymer obtained by copolymerizing a polyalkyleneimine unsaturated monomer and a monomer component containing an unsaturated carboxylic acid monomer as described in International Publication WO 02053611; a polycarboxylic acid copolymer obtained by copolymerizing an unsaturated monomer having polyoxyalkylene and a (meth)acrylic acid monomer as essential components, and a monomer such as (meth)acrylic acid ester and acrylamide, and a monomer having a multi-branched polyalkylene oxide chain as described in Japanese Patent Application No. 2003-341953; a polyoxyalkylene compound obtained by addition-polymerizing alkylene oxide at an amount exceeding an equivalent of active hydrogen of an amino group relative to an active hydrogen-containing amino group contained in polyalkylene polyamine as described in Japanese Kokai Publication 2000-109357. These cement dispersants may be used alone or more of them may be used in combination.

Among the aforementioned cement dispersants, when a polycarboxylic acid copolymer obtained by copolymerizing a polyalkyleneimine unsaturated monomer and a monomer component containing an unsaturated carboxylic acid monomer as described in International Publication WO 02053611 (International Publication No. 02/053611 Pamphlet) and/or a polycarboxylic acid copolymer obtained by copolymerizing an unsaturated monomer and a (meth)acrylic acid monomer as essential components, and a monomer such as (meth) acrylic acid ester and acrylamide, and a monomer having a multi-branched polyalkylene oxide chain as described in Japanese Patent Application No. 2003-341953 and/or a polyoxyalkylene compound obtained by addition-polymerizing alkylene oxide at an amount exceeding an equivalent of active hydrogen of an amino group relative to an active hydrogen-containing amino group contained in polyalkylenepolyamine as described in Japanese Kokai Publication 2000-109357 are used in combination with the cement admixture of the present invention (they are mixed upon use, or they are pre-mixed before use), workability of cement is remarkably improved and, at the same time, change in cement fluidity with time becomes small, being particularly preferable.

Examples of other known cement additive include a cement wetting agents, thickening agents, segregation reduceing agents, flocculants, drying shrinkage reduceing agent's, agents to increase strength, self-leveling agents, corrosion inhibitors, color difference agents, antifungal agents. These known cement additives may be used alone or more of them may be used in combination.

In the aforementioned cement composition, examples of a particularly preferable embodiment of components other than cement and water include the following (1) to (7).

(1) A combination containing two components of <1> the cement admixture of the present invention and <2> an oxyalkylene anti-foaming agent as essential components. As the oxyalkylene anti-foaming agent, polyoxyalkylenes, polyoxyalkylene alkyl ethers, polyoxyalkylene acetylene ethers, and polyoxyalkylene alkyl amines can be used, and polyoxyalkylene alkyl amines are particularly preferable. A ratio by weight of <2> the oxyalkylene anti-foaming agent to be blended is preferably in a range of 0.01 to 20% by weight relative to <1> the cement admixture.

(2) A combination of three components of <1> the cement admixture of the present invention, <2> an oxyalkylene antifoaming agent and <3> an AE agent as essential components. As the oxyalkylene anti-foaming agent, polyoxyalkylenes, polyoxyalkylene alkyl ethers, polyoxyalkylene acetylene ethers, and polyoxyalkylene alkylamines can be used, and polyoxyalkylene alkylamines are particularly preferable. On the other hand, as the AE agent, resin acid soap, alkyl sulfate esters, and alkyl phosphate esters are particularly preferable. A ratio by weight of <1> the cement admixture and <2> the anti-foaming agent to be blended is preferably 0.01 to 20% by weight relative to <1> the cement admixture. On the other hand, a ratio by weight of <3> the AE agent to be blended is preferably 0.001 to 2% by weight relative to cement.

(3) A combination of three components of <1> the cement admixture of the present invention, <2> a copolymer composed of a polyalkylene glycol mono(meth)acrylic acid ester monomer having a polyoxyalkylene chain in which an average molar number of addition of 2 to 300 of alkylene oxide having 2 to 18 carbon atoms is added, a (meth)acrylic acid monomer and a monomer copolymerizable with these monomers (described in Japanese Kokoku Publication Sho-59-18338, Japanese Kokai Publication Hei-7-223852, Japanese Kokai Publication Hei-9-241056), and <3> an oxyalkylene anti-foaming agent as essential components. A ratio by weight of <1> the cement admixture and <2> the copolymer to be blended is preferably in a range of 5/95 to 95/5, more preferably 10/90 to 90/10. A ratio by weight of <3> the oxyalkylene anti-foaming agent to be blended is preferably in a range of 0.01 to 20% by weight relative to a total amount of <1> the cement admixture and <2> the copolymer.

(4) A combination of two components of <1> the cement admixture of the present invention and <2> a retarder as essential components. As the retarder, oxycarboxylic acids such a gluconic acid (salt), and citric acid (salt), sugars such as glucose, sugar alcohols such as sorbitol, and phosphonic acids such as aminotri(methylenephosphonic acid) can be used. A ratio of <1> the cement admixture and <2> the retarder to be blended as expressed by a ratio by weight of the copolymer (A) and/or the copolymer (B) and <2> the retarder is preferably in a range of 50/50 to 99.9/0.1, more preferably in a range of 70/30 to 99/1.

(5) A combination of two components of <1> the cement admixture of the present invention and <2> a promoter as essential components. As the promoter, soluble calcium salts such as calcium chloride, calcium nitrite, and calcium nitrate, chlorides such as iron chloride and magnesium chloride, thiosulfate salt, and formic acid, and formic acid salts such as calcium formate can be used. A ratio by weight of <1> the cement admixture and <2> the promoter to be blended is preferably 10/90 to 99.9/0.1, more preferably 20/80 to 99/1.

(6) A combination of two components of <1> the cement admixture of the present invention and <2> a material segregation reducing agent as essential components. As the material segregation reducing agent, various thickeners such as nonionic cellulose ethers, and a compound having a hydrophobic substituent comprising a hydrocarbon chain having 4 to 30 carbon atoms as a partial structure and a polyoxyalkylene chain in which an average molar number of addition of 2 to 300 of alkylene oxide having 2 to 18 carbon atoms is added can be used. A ratio by weight of <1> the cement admixture and <2> the material segregation reducing agent to be blended is preferably 10/90 to 99.99/0.01, more preferably 50/50 to 99.9/0.1. A cement component of this combination is suitable as a high flowing concrete, a self-filling concrete or a self leveling material.

(7) A combination of two components of <1> the cement admixture of the present invention and <2> a sulfonic acid dispersant having a sulfonic acid group in a molecule as essential components. As the sulfonic acid dispersant, a lignin sulfonic acid salt, a naphthalenesulfonic acid formalin condensate, a melaminesulfonic acid formalin condensate, a polystyrenesulfonic acid salt, and a dispersant of an aminosulfonic acid series such as aminoarylsulfonic acid-phenol-formaldehyde condensate can be used. A ratio of <1> the cement admixture and <2> the sulfonic acid dispersant having a sulfonic acid group in a molecule to be blended expressed as a ratio by weight of <1> the cement admixture and <2> the sulfonic acid dispersant having a sulfonic acid group in a molecule is preferably 5/95 to 95/5, more preferably 10/90 to 90/10.

The cement admixture of the present invention can be used by adding to a cement composition such as a cement paste, a mortar and a concrete like the known cement admixture. Alternatively, the cement admixture of the present invention can be also used in a super high strength concrete. As the aforementioned cement composition, cement components containing cement, water, a fine filler and a crude filler which are conventionally used are preferable. Alternatively, cement compositions to which a fine powder such as a fly ash, a blast furnace slag, silica fume and limestone is added may be used. The super high strength concrete means entity which is generally termed so in the field of cement composition, that is, a concrete in which its hardened product has a strength equivalent to or higher than that of the previous concrete even when a ratio of water/cement is reduced. Examples thereof include a concrete having such workability that it does not affect on normal use even at a ratio of water/cement of 25% by weight, further 20% by weight or less, particularly 18% by weight or less, particularly 14% by weight or less, particularly about 12% by weight, and in which its hardened product exhibits a compression strength of 60 N/mm$^2$ or more, further 80 N/mm$^2$ or more, still further 100 N/mm$^2$ or more, particularly 120 N/mm$^2$ or more, particularly 160 N/mm$^2$ or more, particularly 200 N/mm$^2$ or more.

As the aforementioned cement, a portland cement such as normal, high early strength, super high early strength, moderate heat and white cements; a mixed portland cement such as an alumina cement, a fly ash cement, a blast furnace cement and a silica cement are preferable. For example, in order to prepare a concrete having high durability and high strength, a blending amount and a unit water amount of the cement per 1 m$^3$ of a concrete is preferably a unit water amount of 100 to 185 kg/m$^3$ and water/cement ratio=10 to 70%. More preferably, a unit water amount is 120 to 175 kg/m$^3$, and a water/cement ratio is 20 to 65%.

A ratio of an addition amount of the cement admixture of the present invention in a cement composition is preferably such that a polycarboxylic acid copolymer is preferably 0.01% by weight or more, and preferably 10% by weight or less relative to a total amount of 100% by weight of cement weight. When the ratio is smaller than 0.01% by weight, there is a possibility that performance is insufficient. When the ratio exceeds 10% by weight, economic property is inferior. The ratio is more preferably 0.05% by weight or more and 8% by weight or less, and still more preferably 0.1 by weight or more, and 5% by weight or less. The % by weight is a value in terms of a solid content.

The cement admixture of the present invention has the aforementioned essential features, improves water-reducing property of a cement composition such as a cement paste, a mortar and a concrete, makes a strength and durability of its hardened product excellent, enhances slump-retaining ability of a cement component to maintain fluidity and, moreover, can realize such a viscosity that work is easy in a field handling it. Therefore, since the cement admixture of the present invention can improve work efficacy in constructing a civil engineering·construction structure excellent in fundamental performance, and a hardened cement excellent in a strength and durability can be effectively formed and prepared, it can exert excellent cement dispersing performance and water-reducing performance, and can be suitably applied to various cement components.

BEST MODE FOR CARRYING OUT THE INVENTION

The following examples illustrate the present invention more specifically. They are, however, by no means limitative of the scope of the invention. In the examples, "part(s)" means "part(s) by weight" and "%" denotes "% by weight", unless otherwise specified.

[GPC Molecular Weight Measurement Conditions]
Column used: Tosoh TSK guard column SWXL+TSK gel G4000SWXL+G3000SWXL+G2000SWXL
Eluent: Sodium acetate trihydrate (115.6 g) is dissolved in a mixed solvent composed of 10,999 g of water and 6,001 g of acetonitrile, and the solution is further adjusted to pH 6.0 with acetic acid and used as the solution of the eluent.
Injection volume: 100 µL of the 0.5% solution of the eluent
Eluent flow rate: 0.8 mL/min
Column temperature: 40° C.
Standard samples: Polyethylene glycol, peak-top molecular weights (Mp) 272, 500, 219, 300, 85,000, 46,000, 24,000, 12,600, 4,250, 7,100, 1,470
Order of Calibration curve: 3rd-order
Detector: Waters, Japan's 410 differential refractive index detector
Analysis software: Waters, Japan's MILLENNIUM Ver. 3.21

Production Example 1

Production of $H-(OC_2H_4)_{13}-(OC_3H_6)_2-(OC_2H_4)_{10}-OCH_3$

A reaction apparatus equipped with a thermometer, stirrer, raw material inlet tube and nitrogen inlet tube (nitrogen introducing tube) was charged with 1100 g of polyethylene glycol (n=10) monomethyl ether and 0.5 g of potassium hydroxide. The reaction vessel inside was purged with nitrogen, and heated to 120° C. While maintaining this temperature, 235 g of propylene oxide was added over 3 hours. After the addition, the reaction solution was matured at 120° C. for 2 hours, and the reaction vessel was again purged with nitrogen and at 120° C. Then, 1165 g of ethylene oxide was added over 3 hours. After the addition, the reaction solution was further aged at 120° C. for 1 hour to obtain alkylene glycol monomethyl ether with a hydroxyl value of 48 mg·KOH/g.

Production Example 2

Preparation of Esterified Product (a)

A reaction vessel equipped with a thermometer, stirrer, nitrogen inlet tube and condensation water separating tube was charged with 2083 g of polyalkylene glycol monomethyl ether obtained in Production Example 1, 350 g of methacrylic acid, 54 g of paratoluenesulfonic acid monohydrate, 0.5 g of phenothiazine and 243 g of cyclohexane as an azeotropic solvent, and esterification was performed by heating for 28 hours while maintaining at 115° C. to separate condensation water. At an esterification efficiency of 99% (conversion rate of polyalkylene glycol monomethyl ether); 510 g of distilled water and 41 g of a 30% sodium hydroxide solution were added. Then the reaction vessel was heated again to remove cyclohexane by azeotropy, and distilled water was added to obtain an aqueous solution of a mixture containing 72% of an esterified product (a) and 8% of unreacted methacrylic acid.

Production Example 3

A reaction vessel equipped with a thermometer, stirrer, dropping device, nitrogen inlet tube and reflux condenser (cooling tube) was charged with 50 g of distilled water, and the contents were heated to 80° C. Subsequently, a solution obtained by mixing 200.0 g of an aqueous solution of the mixture of the esterified product (a) and methacrylic acid obtained in Production Example 2, 25.2 g of methacrylic acid, 71.3 g of distilled water and 3.5 g of 3-mercaptopropionic acid was added dropwise over 4 hours, and a solution obtained by mixing 47.9 g of distilled water and 2.1 g of ammonium persulfate was added dropwise over 5 hours. Thereafter, aging was performed for 1 hour while maintaining at 80° C., then the mixture was cooled, a 30% aqueous sodium hydroxide solution was added to adjust a pH to 7, and distilled water was further added to obtain a copolymer (A) containing 75% of the site derived from an esterified product (a) with a weight average molecular weight of 14,000. A composition and a weight average molecular weight of a copolymer (A) are shown in Table 1.

Production Example 4

A reaction vessel equipped with a thermometer, stirrer, a dropping device, nitrogen inlet tube and reflux condenser was charged with 50 g of distilled water, and the contents were heated to 80° C. Subsequently, a solution obtained by mixing 211.1 g of an aqueous solution of the mixture of the esterified product (a) and methacrylic acid obtained in Production Example 2, 16.6 g of methacrylic acid, 69.8 g of distilled water and 2.5 g of 3-mercaptopropionic acid was added dropwise over 4 hours, and a solution obtained by mixing 47.9 g of distilled water and 2.1 g of ammonium persulfate was added dropwise over 5 hours. Thereafter, aging was performed for 1 hour while maintaining at 80° C., then the material was cooled, a 30% aqueous sodium hydroxide solution was added to adjust a pH to 7, and distilled water was further added to obtain a copolymer (B) containing 80% of the site derived from the esterified product (a) with a weight average molecular weight of 18,000. A composition and a weight average molecular weight of a copolymer (B) are shown in Table 1.

Production Example 5

A reaction vessel equipped with a thermometer, stirrer, dropping device, nitrogen inlet tube and reflux condenser was charged with 60 g of distilled water, and the contents were heated to 80° C. Subsequently, a solution obtained by mixing 230.4 g of an aqueous solution of the mixture of the esterified product (a) and methacrylic acid obtained in Production Example 2, 1.6 g of methacrylic acid, 4.0 g of distilled water, 1.3 g of a 30% aqueous sodium hydroxide solution, and 2.7 g of 3-mercaptopropionic acid was added dropwise over 4 hours, and a solution obtained by mixing 49.1 g of distilled water and 0.87 g of a 30% aqueous hydrogen peroxide solution, and a solution obtained by mixing 49.7 g of distilled water and 0.34 g of L-ascorbic acid were added dropwise for 5 hours, respectively. Thereafter, aging was performed for 1 hour while maintaining at 80° C., then the mixture was cooled, a 30% aqueous sodium hydroxide solution was added to adjust a pH to 7, and distilled water was further added to obtain a copolymer (C) containing 89% of the site derived from the esterified product (a) a weight average molecular weight of 11,000. A composition and a weight average molecular weight of a copolymer (C) are shown in Table 1.

Production Example 6

Preparation of Esterified Product (b)

A reaction vessel equipped with a thermometer, stirrer, nitrogen inlet tube and condensation water separating tube was charged with 2033 g of polyethylene glycol (n=25) monomethyl ether, 400 g of methacrylic acid, 54 g of para-toluenesulfonic acid monohydrate, 0.5 g of phenothiazine and 243 g of cyclohexane as an azeotropic solvent, and esterification was performed by heating for 20 hours at 115° C. separating condensation water. At an estrification efficiency of 99% (conversion rate of polyethylene glycol monomethyl ether), 509 g of distilled water and 42 g of a 30% sodium hydroxide solution were added. Then the reaction vessel was heated again to remove cyclohexane by azeotropy, and distilled water was added to obtain an aqueous solution of a mixture containing the esterified product (b) at 70% and unreacted methacrylic acid at 10%.

Production Example 7

A reaction vessel equipped with a thermometer, stirrer, dropping device, nitrogen inlet tube and reflux condenser was charged with 50 g of distilled water, and the contents were heated to 80° C. Subsequently, a solution obtained by mixing 215.9 g of aqueous solution of the mixture of the esterified product (b) and methacrylic acid obtained in Production Example 6, 12.8 g of methacrylic acid, 69.8 g of distilled water and 1.5 g of 3-mercaptopropionic acid was added dropwise over 4 hours, and a solution obtained by mixing 47.9 g of distilled water and 2.1 g of ammonium persulfate was added dropwise over 5 hours. Thereafter, aging was performed for 1 hour while maintaining at 80° C., then the mixture was cooled, a 30% aqueous sodium hydroxide solution was added to adjust a pH to 7, and distilled water was further added to obtain a copolymer (D) containing 80% of the site derived from the esterified product (b) with a weight average molecular weight of 22,000. A composition and a weight average molecular weight of a copolymer (D) are shown in Table 1.

Production Example 8

A reaction vessel equipped with a thermometer, stirrer, addition apparatus, nitrogen inlet tube and reflux condenser was charged with 50 g of distilled water, and the contents were heated to 80° C. Subsequently, a solution obtained by mixing 232.5 g of an aqueous solution of the mixture of the esterified product (b) and methacrylic acid obtained in Production Example 6, 66.5 g of distilled water and 1.1 g of 3-mercaptopropionic acid was added dropwise over 4 hours, and a solution obtained by mixing 47.9 g of distilled water and 2.1 g of ammonium persulfate was added dropwise over 5 hours. Thereafter, aging was performed for 1 hour while maintaining at 80° C., then the material was cooled, a 30% aqueous sodium hydroxide solution was added to adjust a pH to 7, and distilled water was further added to obtain a copolymer (E) containing 87.5% of the site derived from the esterified product (b) with a weight average molecular weight of 22,000. A composition and a weight average molecular weight of a copolymer (E) are shown in Table 1.

TABLE 1

| Polymer | Composition (ratio by mass) | Molecular weight (Mw) |
|---|---|---|
| (A) | PGM-10E2P13E/SMAA = 75/25 | 14000 |
| (B) | PGM-10E2P13E/SMAA = 80/20 | 18000 |
| (C) | PGM-10E2P13E/SMAA = 89/11 | 11000 |
| (D) | PGM-25E/SMAA = 80/20 | 22000 |
| (E) | PGM-25E/SMAA = 87.5/12.5 | 22000 |

In Table 1, "SMAA" represents a sodium methacrylate. "PGM-10E2P13E" is an ester compound (a), and "PGM-25E" is an ester compound (b).

Examples 1 and 2, and Comparative Example 1

Copolymers (A) to (E) obtained in Production Examples were mixed at a ratio indicated in Table 2, and the mixture was assessed by a concrete test method as follows. Results are shown in Table 2. An addition amount represents % by weight of a solid content in an admixture relative to cement weight, and a mixing ratio of an admixture represents a weight ratio of a solid content.

[Concrete Test]
Concrete formulation was conducted following composition.
Water: 172 kg/m³
Cement (Ordinary portland cement: product of Taiheiyo Cement, Sumitomo Osaka Cement, Ube Mitsubishi Cement): 491 kg/m³
Fine aggregate (Ohigawa river sand): 744.6 kg/m³
Coarse aggregate (Oume crushed stone): 909.8 kg/m³
W/C: 35%
Under the above-mentioned formulation, cement admixture is mixed by mixing water in advance, 30 L of concrete ingredient were charged to a 50 L forced action mixer and mixed for 60 seconds. The concrete obtained was measured for slump flow value and air amount according to the Japanese Industrial Standards (JIS A 1101, 1128, and 6204).

[Method of Measuring Flow Stop Value]
A flow stop value was obtained by measuring a time that the flow stopped when the aforementioned initial (0 min) slump flow value was measured.

TABLE 2

| | Cement admixture | Addition amount (%) | Slump flow value(mm) | | | Flow stop value (sec) | Air amount (%) | Concrete Condition |
|---|---|---|---|---|---|---|---|---|
| | | | 0(min) | 30(min) | 60(min) | | | |
| Example 1 | (A)/(C) = 2/8 | 0.26 | 493 | 420 | 378 | 13.3 | 3.8 | ○ |
| Example 2 | (B)/(C) = 2/8 | 0.24 | 500 | 445 | 415 | 13.8 | 3.2 | ○ |
| Comparative Example 1 | (D)/(E) = 2/8 | 0.24 | 510 | 455 | 420 | 16.5 | 3.7 | X |

The condition of a concrete in Table 2 indicates feeling when a concrete was mixed by a scoop, and the better condition of light and smooth feeling is indicated by ○, and the worse condition of heavy and sticky feeling is indicated by X. When a concrete is in the lighter and smoother condition, it is an easily handled concrete.

Production Example 9

Preparation of Monomer (c)

A reaction vessel equipped with a thermometer, stirrer, nitrogen inlet tube and condensation water separating tube was charged with 2203 parts of alkylene glycol monomethyl ether obtained in Production Example 1, 450 parts of methacrylic acid, 59 parts of paratoluenesulfonic acid monohydrate, 0.5 part of phenothiazine and 265 parts of cyclohexane as an azeotropic solvent, and esterification was performed by heating for 20 hours at 115° C. separating condensation water. At an esterification efficiency of 99% (conversion rate of alkylene glycol monomethyl ether), 556 parts of distilled water and 46 parts of a 30% sodium hydroxide solution were added. Then the reaction vessel was heated again to remove cyclohexane by azeotropy, and distilled water was added to obtain an aqueous solution of a mixture containing the esterified product (c-1) having 70% of the structure of the monomer (c) and 10% of the unreacted methacrylic acid.

Production Example 10

Preparation of Monomer (d)

A glass reaction vessel (volume 30 L) equipped with a thermometer, stirrer, nitrogen inlet tube, condenser and condensation water separating tube was charged with 16,500 parts of methoxypolyethylene glycol (n=25), 4,740 parts of methacrylic acid, 235 parts of paratoluenesulfonic acid monohydrate, 5 parts of phenothiazine and 1,060 parts of cyclohexane as an azeotropic solvent, and esterification was performed for 20 hours by heating at 120° C. separating condensation water. At an esterification efficiency of 99% (conversion rate of methoxypolyethylene glycol), 5,857 parts of distilled water and 485 parts of a 30% sodium hydroxide solution were added. Then the reaction vessel was heated again to remove cyclohexan by azeotropy, and distilled water was added to obtain an aqueous solution of a mixture containing the esterified product (d-1) having 70% of the structure of a monomer (d) and 10% of the unsaturated methacrylic acid.

Example 3

A glass-made reaction apparatus equipped with a thermometer, stirrer, dropping device, nitrogen inlet tube and reflux condenser was charged with 240 parts of distilled water, and the contents were heated to 80° C. Next, an aqueous solution obtained by mixing the mixture of 279 parts of solution the esterified product (c-1) and methacrylic acid obtained in Production Example 9, 319.8 parts of an aqueous solution of the mixture of the esterified product (d-1) and methacrylic acid obtained in Production Example 10, 57.8 parts of methacrylic acid, 27.4 parts of distilled water, and 9.72 parts of β-mercaptopropionic acid was added dropwise over 4 hours, and a solution obtained by mixing 115.5 parts of distilled water and 4.5 parts of a hydrogen peroxide was added dropwise over 5 hours, and a solution obtained by mixing 118.2 parts of distilled water and 1.8 parts of L-ascorbic acid was added dropwise over 5 hours. Thereafter, aging was performed for 1 hour while maintaining at 80° C., and the reaction mixture was cooled and then neutralized with a 30% aqueous solution of sodium hydroxide to pH 7, and distilled water was further added, whereby a cement admixture (1) having a solid matter concentration of 45% and containing a polymer that has a weight average molecular weight of 13200 and contains sites derived from the esterified product (c-1) at 37.5% and sites derived from the esterified product (d-1) at 37.5% was obtained.

Production Example 11

According to the same manner as that of Production Example 1, through synthesis of $H-(OC_2H_4)_{13}-(OC_3H_6)_4-(OC_2H_4)_{10}-OCH_3$, esterification with methacrylic acid was carried out to obtain an aqueous solution of a mixture containing 70% of the esterified product (c-2) and 10% of unreacted methacrylic acid.

Example 4

A reaction vessel equipped with a thermometer, stirrer, dropping device, nitrogen inlet tube and reflux condenser was charged with 160 parts of distilled water, and the contents were heated to 80° C. Subsequently, a solution obtained by mixing. 204 parts of an aqueous solution of the mixture of the esterified product (c-2) and methacrylic acid obtained in Production Example 11, 213.2 parts of an aqueous solution of the mixture of the esterified product (d-1) and methacrylic acid obtained in Production Example 10, 20.9 parts of methacrylic acid, 18.2 parts of distilled water and 6.07 parts of β-mercaptopropionic acid was added dropwise over 4 hours, and a solution obtained by mixing 77.0 parts of distilled water and 3.0 parts of a hydrogen peroxide was added dropwise over 5 hours, and a solution obtained by mixing 78.92 parts of distilled water and 1.2 parts of L-ascorbic acid was added dropwise over 5 hours. Thereafter, aging was performed for 1 hour while maintaining at 80° C., and the reaction mixture was cooled and then neutralized with a 30% aqueous solution of sodium hydroxide to pH 7, and distilled water was further added, whereby a cement admixture (2) having a solid matter concentration of 45% and containing a polymer that has a weight average molecular weight of 14700, and contains sites derived from the esterified product (c-2) at 37.5% and sites derived from the esterified product (d-1) at 37.5% was obtained.

Example 5

A reaction vessel equipped with a thermometer, stirrer, dropping device, nitrogen inlet tube and reflux condenser was charged with 240 parts of distilled water, and the contents were heated to 80° C. Subsequently, a solution obtained by mixing 153.0 parts of an aqueous solution of the mixture of the esterified product (c-2) and methacrylic acid obtained in Preparation Example 11, 479.7 parts of an aqueous solution of the mixture of the esterified product (d-1) and methacrylic acid obtained in Preparation Example 10, 29.9 parts of methacrylic acid, 21.9 parts of distilled water, and 9.16 parts of β-mercaptopropionic acid was added dropwise over 4 hours, and a solution obtained by mixing 115.5 parts of distilled water and 4.5 parts of a hydrogen peroxide was added dropwise over 5 hours, and a solution obtained by mixing 78.9 parts of distilled water and 1.2 parts of L-ascorbic acid was added dropwise over 5 hours. Thereafter, aging was performed for 1 hour while maintaining at 80° C., then the reaction mixture was cooled and then neutralized with a 30% aqueous solution of sodium hydroxide to pH 7, and distilled water was further added, whereby a cement admixture (3) having a solid matter concentration of 45% and containing a polymer that has a weight average molecular weight of 14700 and contains sites derived from the esterified product (c-2) at 18.8% and sites derived from the esterified product (d-1) at 56.2% was obtained.

Comparative Example 2

According to the same manner as that of Example 4 except that the aqueous solution of the mixture of the esterified product (d-1) and methacrylic acid was all replaced with the aqueous solution of the mixture of the esterified product (c-2) and methacrylic acid, polymerization was performed and, after cooling, an aqueous sodium oxide solution was added to adjust a pH to 7, and distilled water was further added, whereby a comparative cement admixture (A) having a solid matter concentration of 45% and containing a polymer that has a weight average molecular weight of 14100 and contains sites derived from the esterified product (c-2) at 75% was obtained.

Comparative Example 3

According to the same manner as that of Example 4 except that the aqueous solution of the mixture of the esterified product (c-2) and methacrylic acid was all replaced with the aqueous solution of the mixture of the esterified product (d-1) and methacrylic acid, polymerization was performed and, after cooling, an aqueous sodium oxide solution was added to adjust a pH to 7, and distilled water was further added to obtain a comparative cement admixture (B) having a solid matter concentration of 45% and containing a polymer that has a weight average molecular weight of 14300 and contains sites derived from the esterified product (d-1) at 75%.

[Mortar Test Method]

Using the cement admixtures shown in Examples 3 to 5, and Comparative Examples 2 to 3, mortar was compounded and mixed according to the formulation shown in Table 3, and an admixture addition amount for obtaining prescribed fluidity (flow value), and a viscosity and workability at mixing with scoop were assessed. Results are shown in Table 4.

(Mortar Formulation)

TABLE 3

| W/C | Blending unit amount (parts by weight) | | |
|---|---|---|---|
| (% by mass) | Fine ggregate | Water | Cement |
| 45 | 1350 | 208 | 463 |

Cement: manufactured by Taiheiyo Cement Corporation: normal portland cement

Fine aggregate: cement strength test standard sand (according to JIS R 5201)

A blending amount of a cement admixture relative to a cement weight was calculated by a solid matter amount of an admixture, and % representation is shown in Table 4.

(Mixing Condition)

According to the above formulation, water in which cement and a cement admixture were blended was added to a HOBART mixer, the materials were mixed at rotation 1 for 30 seconds, then a fine aggregate was placed therein, the materials were mixed at rotation 1 for 60 seconds, and further mixed at rotation 2 for 60 seconds. Thereafter the materials attached to a wall were scraped down, and the materials were mixed at rotation 2 for 60 seconds to prepare mortar.

(Assessment Method and Assessment Standard)

A slump flow value of the resulting mortar was obtained according to Japanese Industrial Standards (JIS A 1101, 1128, 6204). A viscosity of mortar shows the feeling when the mortar was mixed using a scoop and was evaluated based on the 5-point scores from 1 to 5 points. That is, 5 points were marked in the case of the highest viscosity and 1 point was marked in the case of the lowest viscosity. Regarding workability, mortar having suitable viscosity and better workability (handling property of mortar) was assessed as ○, and mortar having worse workability such as too high viscosity and stickiness, and too low viscosity and excess flowing was assessed as X.

(Assessment Results)

TABLE 4

| | W/C (% by mass) | Cement admixture | Admixture addition amount (relative to cement mass) | Flow value (mm) | Viscosity | Workability |
|---|---|---|---|---|---|---|
| Example 3 | 45 | (1) | 0.118 | 220 | 3 | ○ |
| Example 4 | 45 | (2) | 0.129 | 219 | 3 | ○ |
| Example 5 | 45 | (3) | 0.112 | 221 | 3 | ○ |
| Comparative Example 2 | 45 | (A) | 0.153 | 219 | 5 | X |
| Comparative Example 3 | 45 | (B) | 0.117 | 218 | 1 | X |

Since the cement admixtures (1) to (3) of the present invention used in Examples 3 to 5 had excellent water-reducing property, these cement admixtures led to good results that an admixture addition amount for realizing a slump flow value of about 220 mm was relatively small, while a more admixture had to be added in the comparative cement admixture (A) used in Comparative Example 2. In addition, since the viscosity of mortar was suitable in Examples 3 to 5 using the cement admixtures (1) to (3) of the present invention, these examples shown better workability, while mortar had worse workability such as too high viscosity and stickiness even when mortar was tried to be mixed with a scoop in Comparative Example 2 using the comparative cement admixture (A). Further, in Comparative Example 3 using the comparative cement admixture (B), since mortar shown low viscosity, mortar flew even when mortar was tried to be mixed with a scoop, therefore, mortar had worse or insufficient workability.

Preparation Example 12

A reaction vessel equipped with a thermometer, stirrer, dropping device, nitrogen inlet tube and reflux condenser was charged with 995 parts of distilled water, and the contents were heated to 70° C. Subsequently, a solution obtained by mixing 1067 parts of methoxypolyethylene glycol monomethacrylate (average molar number of addition of ethylene oxide was 6), 283 parts of methacrylic acid, 41.2 parts of a 48% aqueous sodium hydroxide solution, 20 parts of 3-mercaptopropionic acid and 354 parts of distilled water was added dropwise over 5 hours, and 240 parts of a 6.5% aqueous ammonium persulfate solution was added dropwise over 6 hours. After completion of addition, the reaction mixture was maintained at 70° C. for 1 hour. After cooling, a 30% aqueous sodium hydroxide solution was added to adjust a pH to 7, to obtain a cement admixture (i) having a weight average molecular weight of 14000 as determined by gel permeation chromatography and expressed on the polyethylene glycol equivalent basis.

Preparation Example 13

A glass reaction apparatus equipped with a thermometer, stirrer, dropping device, nitrogen inlet tube and reflux condenser was charged with 344 parts of water, the interior of the reaction apparatus was replaced with nitrogen under stirring, and the contents were heated to 70° C. under the nitrogen atmosphere. An aqueous monomer solution obtained by mixing 1076 parts of methoxypolyethylene glycol monomethacrylate (average molar number of addition of ethylene oxide was 4), 190 parts of methacrylic acid, 754.6 parts of a 43% aqueous solution of the monomer (e) shown in Table 5, 21.7 parts of a 48% of aqueous sodium hydroxide solution, 44.6 parts of 3-mercaptopropionic acid and 287 parts of distilled water was added dropwise over 5 hours, and 240 parts of a 2.0% aqueous hydrogen peroxide and 240 parts of a 2.5% aqueous L-ascorbic acid solution were added dropwise over 6 hours, respectively. Thereafter, temperature was subsequently maintained at 70° C. for 1 hour, and polymerization was completed to obtain a polycarboxylic acid cement admixture (ii) having a weight average molecular weight of 10000.

TABLE 5

| Monomer | Structural formula or explanation |
| --- | --- |
| Monomer(e) | Compound obtained by adding 1.5 moles of glycidyl methacrylate to 1 mole of a polyalkyleneimine alkylene oxide adduct in which 3 moles of ethylene oxide (EO) was added to 1 equivalent of active hydrogen (—NH) derived from an amino group of polyethyleneimine (Mw = 600) |

Preparation Example 14

Preparation of Monomer (f)

According to the same manner as that of Production Example 1, through synthesis of H—(OC$_2$H$_4$)$_7$—(OC$_3$H$_6$)$_2$—(OC$_2$H$_4$)$_6$—OCH$_3$, esterification with methacrylic acid was carried out to obtain an esterified aqueous solution of a mixture containing 90% of monomer (f) and 10% of unreacted methacrylic acid.

Preparation Example 15

A glass reaction apparatus equipped with a thermometer, stirrer, dropping device, nitrogen inlet tube and reflux condenser was charged with 740 parts of water, the interior of the reaction apparatus was replaced with nitrogen under stirring, and the contents were heated to 60° C. under the nitrogen atmosphere. A solution obtained by mixing 1698.17 parts of an esterified aqueous solution (f) obtained in Preparation Example 14, 30.65 parts of methacrylic acid, 32.04 parts of a 30% aqueous sodium hydroxide solution, 8.98 parts of 3-mercaptopropionic acid and 10.15 parts of distilled water was added dropwise over 4 hours, and 240 parts of a 1.1% aqueous hydrogen peroxide solution and 240 parts of a 1.4% aqueous L-ascorbic acid solution were added dropwise over 6 hours. After completion of addition, the reaction mixture was maintained at 60° C. for 1 hour. After cooling, a 30% aqueous sodium hydroxide solution was added to adjust a pH to 7, to obtain a cement admixture (iii) having a weight average molecular weight of 22000 as determined by gel permeation chromatography and expressed on the polyethylene glycol equivalent basis.

Preparation Example 16

Preparation of Aqueous Macromer Solution

A glass reaction apparatus equipped with a thermometer, stirrer, dropping device and reflux condenser was charged with 754 parts of a polyethyleneimine ethylene oxide adduct (compound in which an average molar number of addition of 20 of ethylene oxide was added to active hydrogen of polyethyleneimine having a molecular weight of 600), 1.27 parts of acetic acid and 0.15 part of p-methoxyphenol, then the contents were heated to 90° C. under stirring. The reaction system was maintained at 90° C., and 12.5 parts of glycidyl methacrylate was added for 30 minutes while the reaction system was retained at 90° C. After completion of addition, stirring was continued at 90° C. for 1 hour, the contents were cooled to 60° C., and 768 parts of water and 14.3 parts of acetic acid were added to obtain an aqueous solution of a macromer of a polyethyleneimine ethylene oxide adduct.

[Preparation of Cement Admixture (iv)]

A reaction vessel equipped with a thermometer, stirrer, dropping device, nitrogen inlet tube and reflux condenser was charged with 700 parts of distilled water, and the contents were heated to 70° C. Subsequently, a solution obtained by mixing 832.5 parts of methoxypolyethylene glycol monomethacrylate (average molar number of addition of ethylene oxide was 10), 260.5 parts of methacrylic acid, 154.1 parts of methyl methacrylate, 36.2 parts of a 48% aqueous sodium hydroxide solution, 40.2 parts of 3-mercaptopropionic acid and 243 parts of distilled water was added dropwise over 5 hours, and 240 parts of a 2.1% aqueous hydrogen peroxide was added over 6 hours, and 240 parts of an 2.7% aqueous L-ascorbic acid solution was added dropwise over 6 hours. After four hours and five minutes from initiation of addition of these solutions, addition dropwise of 208 parts of the above aqueous macromer solution was initiated at 3.78 parts/minuite. After completion of addition of all solutions, the reaction mixture was maintained at 70° C. for 1 hour. After cooling, a 30% aqueous sodium hydroxide solution was added to adjust a pH to 7, to obtain a cement admixture (iv) having a weight average molecular weight of 6000 as determined by gel permeation chromatography and expressed on the polyethylene glycol equivalent basis.

Examples 6 to 10

The cement admixture (1) prepared in Examples 3, the cement admixtures (i) to (iv) prepared in Preparation Examples 12 to 15 and cement admixtures (v) and (vi) shown in Table 6 were mixed according to the formulation shown in Table 7 to obtain cement admixtures (4) to (8) of the present invention. Using the cement admixtures (4) to (8) of the present invention, the concrete test was carried out, and a viscosity and workability at mixing with a scoop were assessed. Results are shown in Table 8.

TABLE 6

| Cement admixture | Structural formula or explanation |
|---|---|
| (v) | A polyalkyleneimine-alkylene oxide adduct obtained by addition of 3 moles of ethylene oxide relative to 1 equivalent of active hydrogen atom (—NH) derived from an amino group of polyethyleneimine (MW = 1800) |
| (vi) | A polyalkyleneimine-alkylene oxide adduct obtained by addition of 3 moles of ethylene oxide, then 6 moles of propylene oxide, and further 17 moles of ethylene oxide relative to 1 equivalent of active hydrogen atom (—NH) derived from an amino group of polyethyleneimine (MW = 600) |

TABLE 7

| Cement admixture No. | (1) | (i) | (ii) | (iii) | (iv) | (v) | (vi) |
|---|---|---|---|---|---|---|---|
| (4) | 30.0 | 42.6 | 13.7 | — | — | 13.7 | — |
| (5) | 30.0 | — | — | 70.0 | — | — | — |
| (6) | 30.0 | — | — | 60.0 | — | — | 10.0 |
| (7) | 30.0 | — | — | — | 70.0 | — | — |
| (8) | 30.0 | — | — | — | 60.0 | — | 10.0 | aggregate were the same as those described above, and 744.5 kg/m$^3$ of fine aggregate was used.

An antifoaming agent MA404 (product of Pozzolith Bussan Co., Ltd.) and an AE agent MA303A (product of Pozzolith Bussan Co., Ltd.) in amounts of 0.003% and 0.01%, respectively, of the cement mass were mixed.

The mixing amount of the cement admixture relative to the cement mass was calculated as the solid matter amount of the admixture, and shown in Table 8 by % (% by mass).
(Concrete Preparation Condition)

In the above-mentioned amount, cement, fine aggregates and coarse aggregates were charged into a 50 L forced action mixer and conducted to dry mixing for 10 seconds. Then, water formulated with each cement admixture was added, and mixing was further performed for 60 seconds to produce concrete.
(Assessing Method and Assessing Criteria)

The concrete obtained was measured for slump flow value and air amount (air content) as described above. A viscosity of concrete shows the feeling when the concrete was mixed using a scoop and was evaluated based on the 5-point scores from 1 to 5 points. That is, 5 points were marked in the case of the highest viscosity and 1 point was marked in the case of the lowest viscosity.

Regarding workability, concrete having suitable viscosity and particularly better workability (handling property of concrete) was assessed as ⊚, concrete having better workability was assessed as ○, and concrete having worse workability such as too high viscosity and stickiness, and too low viscosity and excess flowing was assessed as X.
(Assessment Results)

TABLE 8

| | W/C (% by mass) | Cement admixture | Admixture addition amount (relative to cement mass) | Flow value (mm) | Viscosity | Workability |
|---|---|---|---|---|---|---|
| Example 6 | 30 | (4) | 0.34 | 608 | 3 | ⊚ |
| Example 7 | 30 | (5) | 0.37 | 593 | 4 | ○ |
| Example 8 | 30 | (6) | 0.37 | 614 | 3 | ○ |
| Example 9 | 30 | (7) | 0.37 | 589 | 4 | ○ |
| Example 10 | 30 | (8) | 0.37 | 603 | 3 | ○ |
| Comparative Example 4 | 30 | (A) | 0.47 | 583 | 5 | X |
| Comparative Example 5 | 30 | (B) | 0.37 | 685 | 1 | X |

Comparative Example 4 and Comparative Example 5

Using the comparative cement admixture (A) and the comparative cement admixture (B) prepared in Comparative Example 2 and Comparative Example 3, the concrete test was carried out, and a viscosity and workability at mixing with a scoop were assessed. Results are shown in Table 8.
[Concrete Test Method]

Using the cement admixtures shown in Examples 6 to 10, and Comparative Examples 2 to 3, concretes were compounded and mixed according to the following formulation, and an admixture addition amount for obtaining prescribed fluidity (flow value), and a viscosity and workability at mixing with a scoop were assessed.
(Concrete Formulation)

Regarding the unit amount of formulation, water, cement (manufactured by Sumitomo Osaka Cement) and coarse Since the cement admixtures (4) to (8) of the present invention used in Examples 6 to 10 had excellent water-reducing property, these cement admixtures led to good results that an admixture addition amount for realizing a slump flow value of about 600 mm was relatively small, while a more admixture had to be added in the comparative cement admixture (A) used in Comparative Example 4. In addition, since the viscosity of concrete was suitable in Examples 6 to 10 using the cement admixtures (4) to (8) of the present invention, these examples shown better or particularly better workability, while concrete had worse workability such as too high viscosity and stickiness in Comparative Example 4 using the comparative cement admixture (A). Further, in Comparative Example 4 using the comparative cement admixture (B), since concrete shown low viscosity, concrete flew even when concrete was tried to be mixed with a scoop, therefore, concrete had worse or insufficient workability.

Preparation Example 17

Preparation of Monomer (g)

According to the same manner as that of Preparation Example 1, through synthesis of H—(OC$_2$H$_4$)$_6$—OCH$_3$, esterification with methacrylic acid was carried out to obtain an esterified aqueous solution of a mixture containing 90% of monomer (g) and 10% of unreacted methacrylic acid.

Production Example 18

A glass-made reaction apparatus equipped with a thermometer, stirrer, dropping device, nitrogen inlet tube and reflux condenser was charged with 635.4 parts of water, and the reaction apparatus inside was purged with nitrogen with stirring, and the contents were heated to 60° C. in a nitrogen atmosphere. Next, a solution composed of 1029.9 parts of an esterified aqueous solution (f) obtained in Production Example 14, 569.9 parts of an esterified aqueous solution (g) obtained in Production Example 17, 92.9 parts of methacrylic acid, 28.3 parts of a 30% aqueous solution of sodium hydroxide and 24.1 parts of 3-mercaptopropionic acid was added dropwise over 4 hours, 300 parts of a 1.17% aqueous hydrogen peroxide solution was added dropwise over 5 hours, and 300 parts of a 1.51% aquepus L-ascorbic acid solution was added dropwise over 5 hours to the reaction vessel. After completion of the dropping, the temperature was maintained at 60° C. for 1 hour. Thereafter, the reaction mixture was cooled and then neutralized with a 30% aqueous solution of sodium hydroxide to pH 7, whereby a cement admixture (vii) with a weight average molecular weight of 10000 as determined by gel permeation chromatography and expressed on the polyethylene glycol equivalent basis was obtained.

Production Example 19

A glass-made reaction apparatus equipped with a thermometer, stirrer, dropping device, nitrogen inlet tube and reflux condenser was charged with 635.4 parts of water, and the reaction apparatus inside was purged with nitrogen with stirring, and the contents were heated to 60° C. in a nitrogen atmosphere. Next, a solution composed of 1539.5 parts of an esterified aqueous solution (f) obtained in Production Example 14, 92.9 parts of methacrylic acid, 28.3 parts of a 30% aqueous solution of sodium hydroxide and 25.7 parts of 3-mercaptopropionic acid was added dropwise over 4 hours, 300 parts of a 1.02% aqueous hydrogen peroxide solution was added dropwise over 5 hours, and 300 parts of a 1.31% aquepus L-ascorbic acid solution was added dropwise over 5 hours to the reaction vessel. After completion of the dropping, the temperature was maintained at 60° C. for 1 hour. Thereafter, the reaction mixture was cooled and then neutralized with a 30% aqueous solution of sodium hydroxide to pH 7, whereby a cement admixture (viii) with a weight average molecular weight of 10000 as determined by gel permeation chromatography and expressed on the polyethylene glycol equivalent basis was obtained.

Production Example 20

A glass-made reaction apparatus equipped with a thermometer, stirrer, dropping device, nitrogen inlet tube and reflux condenser was charged with 635.4 parts of water, and the reaction apparatus inside was purged with nitrogen with stirring, and the contents were heated to 60° C. in a nitrogen atmosphere. Next, a solution composed of 569.9 parts of an esterified aqueous solution (g) obtained in Production Example 17, 92.9 parts of methacrylic acid, 28.3 parts of a 30% aqueous solution of sodium hydroxide and 17.8 parts of 3-mercaptopropionic acid was added dropwise over 5 hours, 300 parts of a 1.17% aqueous hydrogen peroxide solution was added dropwise over 6 hours, and 300 parts of a 1.51% aquepus L-ascorbic acid solution was added dropwise over 6 hours to the reaction vessel. After completion of the dropping, the temperature was maintained at 60° C. for 1 hour. Thereafter, the reaction mixture was cooled and then neutralized with a 30% aqueous solution of sodium hydroxide to pH 7, whereby a cement admixture (ix) with a weight average molecular weight of 10000 as determined by gel permeation chromatography and expressed on the polyethylene glycol equivalent basis was obtained.

Examples 11 to 13

The copolymer (A) prepared in Production Example 3 and the cement admixtures (vii) to (ix) prepared in Preparation Examples 18 to 20 were mixed according to the formulation shown in Table 9 to obtain cement admixtures (9) to (11) of the present invention. Using the cement admixtures (9) to (11) of the present invention, the concrete test was carried out, and a viscosity and workability at mixing with a scoop were assessed.

TABLE 9

| Cement admixture No. | Copolymer (A) | (vii) | (viii) | (ix) |
|---|---|---|---|---|
| (9) | 30 | 70 | — | — |
| (10) | 30 | — | 70 | — |
| (11) | 30 | — | — | 70 |

[Concrete Test Method]

Using the cement admixtures (9) to (11) shown in Table 9, concretes were prepared according to the formulation shown in Table 10, and the respective properties were evaluated for each concrete.

TABLE 10

| W/C | Ratio of fine | Mixing unit amount (kg/m$^3$) | | | | |
|---|---|---|---|---|---|---|
| (% by mass) | aggregate (% by volume) | Air | Water | Cement | Coarse aggregate | Fine aggregate |
| 45 | 48.1 | 45 | 172.0 | 382.2 | 909.8 | 835.1 |
| 30 | 42.9 | 45 | 172.0 | 573.3 | 909.8 | 676.6 |

The descriptions in Table 10 are as follows.
W/C (% by mass): water/cement×100
Ratio of fine aggregate (% by volume):

Amount of fine aggregates/(coarse aggregates+fine aggregates)×100

Cement: mixing three species of ordinary portland cements, produced by Taiheiyo Cement, Sumitomo Osaka Cement and Ube Mitsubishi Cement
Coarse aggregate: lime crushed stone produced in Hachinohe, Aomori prefecture
Fine aggregate: pit sand produced in Chiba prefecture
(Concrete Preparation Condition)

With the above-mentioned formulation, the concretes were mixed by using a pan forced action mixer (rotation 40 rpm: content 50 L). The mixing method was as follows, and 30 liter of concrete was mixed up per batch.

W/C 45 (in the case where W/C is 45% by mass): Coarse aggregates, fine aggregates and cement were charged at once, and the mixture was conducted to dry mixing for 10 seconds. Then, water mixed with the cement admixture was added thereto to carry out mixing for 90 seconds to produce concrete.

W/C 30 (in the case where W/C is 30% by mass): Fine aggregates and cement were charged at once, and the mixture was conducted to dry mixing for 10 seconds. Then, water mixed with the cement admixture was added thereto to carry out mixing for 60 seconds. Furthermore, coarse aggregates were charged thereto, and the mixture was mixed for 60 seconds to produce concrete.

(Assessing Method and Assessing Criteria)

The concrete obtained was measured for slump flow value and air amount (air content) as described above. A viscosity of concrete shows the feeling when the concrete was mixed using a scoop and was evaluated based on the 5-point scores from 1 to 5 points. That is, 5 points were marked in the case of the highest viscosity and 1 point was marked in the case of the lowest viscosity.

Regarding workability, concrete having suitable viscosity and particularly better workability (handling property of concrete) was assessed as ⊚, concrete having better workability was assessed as ○, and concrete having worse workability such as too high viscosity and stickiness, and too low viscosity and excess flowing was assessed as x.

(Assessment Results)

TABLE 11

|  | W/C (% by mass) | Cement admixture | Admixture addition amount (relative to cement mass) | Slump flow value(mm) 0 (min) | Slump flow value(mm) 30 (min) | Slump flow value(mm) 60 (min) | Viscosity | Workability |
|---|---|---|---|---|---|---|---|---|
| Example 11 | 30 | (9) | 0.30 | 590 | 613 | 573 | 3 | ⊚ |
|  | 45 | (9) | 0.18 | 390 | 320 | 258 |  |  |
| Example 12 | 30 | (10) | 0.23 | 605 | 520 | 405 | 4 | ○ |
|  | 45 | (10) | 0.16 | 410 | 312 | 230 |  |  |
| Example 13 | 30 | (11) | 0.45 | 628 | 670 | 633 | 2 | ○ |
|  | 45 | (11) | 0.23 | 400 | 355 | 315 |  |  |

The cement admixture (9) used in Example 11 exhibited excellent properties, showing excellent balance of the viscosity of concrete, and further excellent balance between the addition amount and the slump-retaining ability. The cement admixture (10) used in Example 12 includes the copolymer formed from monomer (f) containing the unit of —($C_3H_6O$)$_2$—, without monomer (g). The cement admixture (10) exhibited excellent properties, showing that an admixture addition amount was relatively small, and the viscous feeling of concrete was felt to the extent of slightly high when compared to Example 11, therefore, it shown better workability even though result inferior in the slump-retaining ability. The cement admixture (11) used in Example 13 includes the copolymer formed from monomer (g) not containing the unit of —($C_3H_6O$)$_2$. The cement admixture (11) exhibited excellent properties, showing the particularly better slump-retaining ability, and the viscous feeling of concrete was felt to the extent of slightly low when compared to Example 11, therefore, it shown better workability even though more admixture addition amount was required.

The present application claims priority under 35 U.S.C. §119 to Japanese Patent Application No. 2003-376183 filed Nov. 5, 2003, entitled "CEMENT ADMIXTURE", Japanese Patent Application No. 2004-167295 filed Jun. 4, 2004, entitled "CEMENT ADMIXTURE" and Japanese Patent Application No. 2004-186452 filed Jun. 24, 2004, entitled "CEMENT ADMIXTURE". The contents of these applications are incorporated herein by reference in their entirely.

The invention claimed is:

1. A cement admixture
which comprises a polycarboxylic acid copolymer having a polyalkylene glycol side chain,
said polycarboxylic acid copolymer being constituted of two or more species of copolymers with different acid values, and
at least one of said two or more species of copolymers with different acid values having an oxyalkylene group containing 3 or more carbon atoms, wherein a content of the polycarboxylic acid copolymer having a polyalkylene glycol side chain containing an oxyalkylene group having 3 or more carbon atoms is 70% by weight or larger, relative to 100% by weight of the total polymer amount contained in the cement admixture.

2. The cement admixture according to claim 1,
wherein the ratio of the acid value of said two or more species of copolymers is 1.2 to 5.

3. A cement admixture
which comprises a polycarboxylic acid copolymer having a polyalkylene glycol side chain containing an oxyalkylene group having 3 or more carbon atoms,
said polycarboxylic acid copolymer being constituted of two or more species of copolymers with a weight average molecular weight of 20000 or less, and wherein said two or more species of copolymers having different acid values and the ratio of the acid value of said copolymers is 3 or less.

4. The cement admixture according to claim 1,
wherein said copolymer has a site represented by the following formula (1);

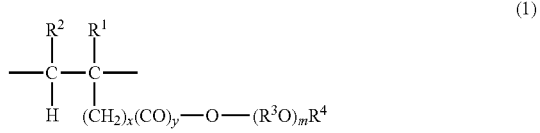

in the formula, $R^1$ and $R^2$ are the same or different and each represents a hydrogen atom or a methyl group; x represents a number of 0 to 2, y represents 0 or 1; $R^3$Os are the same or different and each represents an oxyalkylene group having 2 to 18 carbon atoms, and 0.01 to 49 mole % of an average molar number of addition of the oxyalkylene group is an oxyalkylene group having 3 to 18 carbon atoms; $R^4$ represents a hydrogen atom or a hydrocarbon group having 1 to 30 carbon atoms; and m is an average molar number of addition of the oxyalkylene group, and represents a number of 3 to 300, and a site represented by the following formula (2);

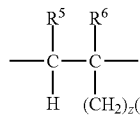  (2)

in the formula, $R^5$ and $R^6$ are the same or different and each represents a hydrogen atom or a methyl group; z represents a number of 0 to 2; w represents 0 or 1; $R^7$ represents a hydrogen atom or a hydrocarbon group having 1 to 30 carbon atoms; and n is an average molar number of addition of an oxyethylene group, and represents a number of 1 to 300.

5. The cement admixture according to claim 3, wherein said polycarboxylic acid copolymer has the site represented by the following formula (1);

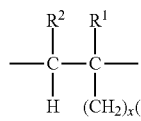  (1)

in the formula, $R^1$ and $R^2$ are the same or different and each represents a hydrogen atom or a methyl group; x represents a number of 0 to 2; y represents 0 or 1; $R^3$Os are the same or different and each represents an oxyalkylene group having 2 to 18 carbon atoms, and 0.01 to 49 mole % of an average molar number of addition of the oxyalkylene group is an oxyalkylene group having 3 to 18 carbon atoms; $R^4$ represents a hydrogen atom or a hydrocarbon group having 1 to 30 carbon atoms; and m is an average molar number of addition of the oxyalkylene group, and represents a number of 3 to 300, and the site represented by the following formula (2);

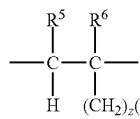  (2)

in the formula, $R^5$ and $R^6$ are the same or different and each represents a hydrogen atom or a methyl group; z represents a number of 0 to 2; w represents 0 or 1; $R^7$ represents a hydrogen atom or a hydrocarbon group having 1 to 30 carbon atoms; and n is an average molar number of addition of an oxyethylene group, and represents a number of 1 to 300, wherein $(R^3O)_m$ in the formula (1) is the following formula (6):

  (6)

in the formula, $R^8$ represents an alkylene group having 3 to 18 carbon atoms; r and q are average molar numbers of addition of oxyethylene groups, and each represents a number of 1 to 300; p represents an average molar number of addition of the oxyalkylene group, and is a number of 1 to 50, and r+p+q is a number of 3 to 300.

6. The cement admixture according to claim 5, wherein a mole ratio of the site represented by the formula (1) and the site represented by the formula (2) in said polycarboxylic acid copolymer: (A)/(B) is 1/99 to 99/1.

7. The cement admixture according to claim 2, wherein said copolymer has a site represented by the following formula (1);

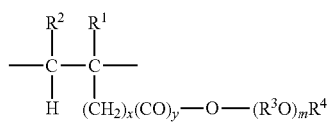  (1)

in the formula, $R^1$ and $R^2$ are the same or different and each represents a hydrogen atom or a methyl group; x represents a number of 0 to 2, y represents 0 or 1; $R^3$Os are the same or different and each represents an oxyalkylene group having 2 to 18 carbon atoms, and 0.01 to 49 mole % of an average molar number of addition of the oxyalkylene group is an oxyalkylene group having 3 to 18 carbon atoms; $R^4$ represents a hydrogen atom or a hydrocarbon group having 1 to 30 carbon atoms; and m is an average molar number of addition of the oxyalkylene group, and represents a number of 3 to 300, and a site represented by the following formula (2);

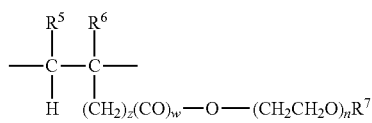  (2)

in the formula, $R^5$ and $R^6$ are the same or different and each represents a hydrogen atom or a methyl group; z represents a number of 0 to 2; w represents 0 or 1; $R^7$ represents a hydrogen atom or a hydrocarbon group having 1 to 30 carbon atoms; and n is an average molar number of addition of an oxyethylene group, and represents a number of 1 to 300.

8. The cement admixture according to claim 3, wherein said copolymer has a site represented by the following formula (1);

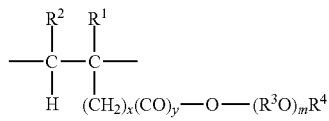  (1)

in the formula, $R^1$ and $R^2$ are the same or different and each represents a hydrogen atom or a methyl group; x represents a number of 0 to 2, y represents 0 or 1; $R^3$Os are the same or different and each represents an oxyalkylene group having 2 to 18 carbon atoms, and 0.01 to 49 mole % of an average molar number of addition of the oxyalkylene group is an oxyalkylene group having 3 to 18 carbon atoms; $R^4$ represents a hydrogen atom or a hydrocarbon group having 1 to 30 carbon atoms; and m is an average molar number of addition of the oxyalkylene group, and represents a number of 3 to 300, and a site represented by the following formula (2);

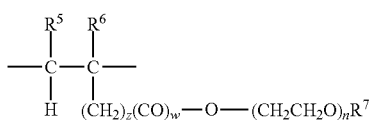

in the formula, $R^5$ and $R^6$ are the same or different and each represents a hydrogen atom or a methyl group; z represents a number of 0 to 2; w represents 0 or 1; $R^7$ represents a hydrogen atom or a hydrocarbon group having 1 to 30 carbon atoms; and n is an average molar number of addition of an oxyethylene group, and represents a number of 1 to 300.

9. The cement admixture according to claim 1, wherein said polycarboxylic acid copolymer having a polyalkylene glycol side chain containing an oxyalkylene group having 3 or more carbon atoms is obtained by polymerizing a monomer component containing a polyalkylene glycol unsaturated monomer represented by the following formula (4);

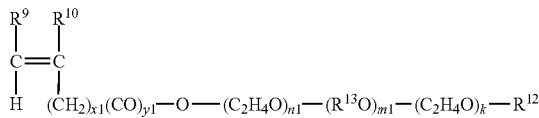

in the formula, $R^9$ and $R^{10}$ are the same or different, and represent a hydrogen atom or a methyl group, $R^{13}$s are the same or different, and represent an alkylene group having 3 to 18 carbon atoms, and, x1 represents a number of 0 to 2, y1 represents 0 or 1, n1 and k represent an average molar number of addition of an oxyethylene group, n1 is a number of 1 to 200, k is a number of 1 to 200, m1 represents an average molar number of addition of an oxyalkylene group, and is a number of 1 to 50, and n1+m1+k is a number of 3 to 200, and $R^{12}$ represents a hydrogen atom or a hydrocarbon group having 1 to 20 carbon atom(s).

10. The cement admixture according to claim 3, wherein said polycarboxylic acid copolymer having a polyalkylene glycol side chain containing an oxyalkylene group having 3 or more carbon atoms is obtained by polymerizing a monomer component containing a polyalkylene glycol unsaturated monomer represented by the following formula (4);

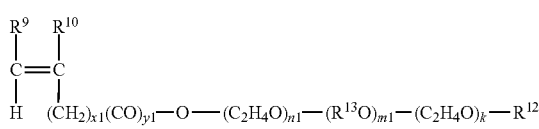

in the formula, $R^9$ and $R^{10}$ are the same or different, and represent a hydrogen atom or a methyl group, $R^{13}$s are the same or different, and represent an alkylene group having 3 to 18 carbon atoms, and, x1 represents a number of 0 to 2, y1 represents 0 or 1, n1 and k represent an average molar number of addition of an oxyethylene group, n1 is a number of 1 to 200, k is a number of 1 to 200, m1 represents an average molar number of addition of an oxyalkylene group, and is a number of 1 to 50, and n1+m1+k is a number of 3 to 200, and $R^{12}$ represents a hydrogen atom or a hydrocarbon group having 1 to 20 carbon atom(s).

11. The cement admixture according to claim 3 wherein, a content of the polycarboxylic acid copolymer having a polyalkylene glycol side chain containing an oxyalkylene group having 3 or more carbon atoms is 70% by weight or larger, relative to 100% by weight of the total polymer amount contained in the cement admixture.

12. The cement admixture according to claim 5 wherein, a content of the polycarboxylic acid copolymer having a polyalkylene glycol side chain containing an oxyalkylene group having 3 or more carbon atoms is 70% by weight or larger, relative to 100% by weight of the total polymer amount contained in the cement admixture.

13. The cement admixture according to claim 1, which contains a polyoxyalkylene compound containing at least one nitrogen atom and, at the same time, having an oxyethylene group and an oxyalkylene group having 3 or more carbon atoms in a molecule, and containing an aliphatic hydrocarbon structure in which 5 or more carbon atoms are bound successively.

14. The cement admixture according to claim 13 wherein the polyoxyalkylene compound is a compound represented by the formula (10):

$$Z-[(AO)_s-R^{17}]_t \quad (10);$$

wherein Z represents a compound residue having active hydrogen, $R^{17}$s are the same or different, and represent a hydrogen atom, a hydrocarbon group, $-Y-NR^{18}R^{19}$, $-COR^{20}$ or $-CH_2CH_2NHCO-R^{21}$, Y represents an alkylene group having 1 to 10 carbon atom(s), $R^{18}$ and $R^{19}$ are the same or different, and represent a hydrogen atom or a hydrocarbon group having 1 to 30 carbon atom(s), $R^{20}$ and $R^{21}$ represent a hydrocarbon group having 1 to 30 carbon atom(s), or a group having at least one carboxyl group or sulfonyl group or a salt thereof, AOs are the same or different, and represent an oxyalkylene group having 2 to 18 carbon atoms, "s"s are the same or different, and represent an average molar number of addition of an oxyalkylene group, and is 1 to 300, t is 1 to 300 and, regarding the total molar number of addition of the oxyethylene group in the oxyalkylene group as u and a total molar number of addition of an oxyalkylene group having 3 or more carbon atoms to be v, a relationship of 0.1<u/(u+v)<0.9, 1<u+v<300 is satisfied.

15. The cement admixture according to claim 3, which contains a polyoxyalkylene compound containing at least one nitrogen atom and, at the same time, having an oxyethylene group and an oxyalkylene group having 3 or more carbon atoms in a molecule, and containing an aliphatic hydrocarbon structure in which 5 or more carbon atoms are bound successively.

16. The cement admixture according to claim 15 wherein the polyoxyalkylene compound is a compound represented by the formula (10):

$$Z-[(AO)_s-R^{17}]_t \quad (10);$$

wherein Z represents a compound residue having active hydrogen, $R^{17}$s are the same or different, and represent a hydrogen atom, a hydrocarbon group, $-Y-NR^{18}R^{19}$, $-COR^{20}$ or $-CH_2CH_2NHCO-R^{21}$, Y represents an alkylene group having 1 to 10 carbon atom(s), $R^{18}$ and $R^{19}$ are the same or different, and represent a hydrogen atom or a hydrocarbon group having 1 to 30 carbon atom(s), $R^{20}$ and $R^{21}$ represent a hydrocarbon group having 1 to 30 carbon atom(s), or a group having at least one carboxyl group or sulfonyl group or a salt thereof, AOs are the same or different, and represent an oxyalkylene group having 2 to 18 carbon atoms, "s"s are the same or different, and represent an average molar number of addition of an oxyalkylene group, and is 1 to 300, t is 1 to 300 and, regarding the total molar number of addition of the oxyethylene group in the oxyalkylene group as u and a total molar number of addition of an oxyalkylene group having 3 or more carbon atoms to be v, a relationship of $0.1<u/(u+v)<0.9$, $1<u+v<300$ is satisfied.

17. The cement admixture according to claim 5, which contains a polyoxyalkylene compound containing at least one nitrogen atom and, at the same time, having an oxyethylene group and an oxyalkylene group having 3 or more carbon atoms in a molecule, and containing an aliphatic hydrocarbon structure in which 5 or more carbon atoms are bound successively.

18. The cement admixture according to claim 17 wherein the polyoxyalkylene compound is a compound represented by the formula (10):

$$Z—[(AO)_s—R^{17}]_t \qquad (10);$$

wherein Z represents a compound residue having active hydrogen, $R^{17}$s are the same or different, and represent a hydrogen atom, a hydrocarbon group, $—Y—NR^{18}R^{19}$, $—COR^{20}$ or $—CH_2CH_2NHCO—R^{21}$, Y represents an alkylene group having 1 to 10 carbon atom(s), $R^{18}$ and $R^{19}$ are the same or different, and represent a hydrogen atom or a hydrocarbon group having 1 to 30 carbon atom(s), $R^{20}$ and $R^{21}$ represent a hydrocarbon group having 1 to 30 carbon atom(s), or a group having at least one carboxyl group or sulfonyl group or a salt thereof, AOs are the same or different, and represent an oxyalkylene group having 2 to 18 carbon atoms, "s"s are the same or different, and represent an average molar number of addition of an oxyalkylene group, and is 1 to 300, t is 1 to 300 and, regarding the total molar number of addition of the oxyethylene group in the oxyalkylene group as u and a total molar number of addition of an oxyalkylene group having 3 or more carbon atoms to be v, a relationship of $0.1<u/(u+v)<0.9$, $1<u+v<300$ is satisfied.

19. The cement admixture according to claim 1, wherein said polycarboxylic acid copolymer has the site represented by the following formula (1);

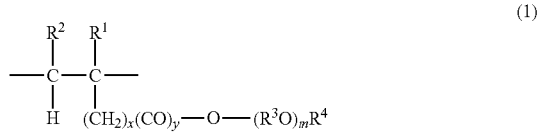

in the formula, $R^1$ and $R^2$ are the same or different and each represents a hydrogen atom or a methyl group; x represents a number of 0 to 2; y represents 0 or 1; $R^3$Os are the same or different and each represents an oxyalkylene group having 2 to 18 carbon atoms, and 0.01 to 49 mole % of an average molar number of addition of the oxyalkylene group is an oxyalkylene group having 3 to 18 carbon atoms; $R^4$ represents a hydrogen atom or a hydrocarbon group having 1 to 30 carbon atoms; and m is an average molar number of addition of the oxyalkylene group, and represents a number of 3 to 300, and the site represented by the following formula (2);

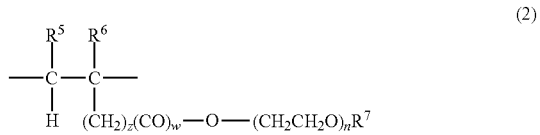

in the formula, $R^5$ and $R^6$ are the same or different and each represents a hydrogen atom or a methyl group; z represents a number of 0 to 2; w represents 0 or 1; $R^7$ represents a hydrogen atom or a hydrocarbon group having 1 to 30 carbon atoms; and n is an average molar number of addition of an oxyethylene group, and represents a number of 1 to 300, wherein $(R^3O)_m$ in the formula (1) is the following formula (6):

$$—(C_2H_4O)_r\text{'}(R^8O)_p—(C_2H_4O)_q— \qquad (6)$$

in the formula, $R^8$ represents an alkylene group having 3 to 18 carbon atoms; r and q are average molar numbers of addition of oxyethylene groups, and each represents a number of 1 to 300; p represents an average molar number of addition of the oxyalkylene group, and is a number of 1 to 50, and r+p+q is a number of 3 to 300.

20. The cement admixture according to claim 19, wherein a mole ratio of the site represented by the formula (1) and the site represented by the formula (2) in said polycarboxylic acid copolymer: (A)/(B) is 1/99 to 99/1.

21. The cement admixture according to claim 19, which contains a polyoxyalkylene compound containing at least one nitrogen atom and, at the same time, having an oxyethylene group and an oxyalkylene group having 3 or more carbon atoms in a molecule, and containing an aliphatic hydrocarbon structure in which 5 or more carbon atoms are bound successively.

22. The cement admixture according to claim 19 wherein the polyoxyalkylene compound is a compound represented by the formula (10):

$$Z—[(AO)_s—R^{17}]_t \qquad (10);$$

wherein Z represents a compound residue having active hydrogen, R17s are the same or different, and represent a hydrogen atom, a hydrocarbon group, —Y—NR18R19, —COR20 or —CH2CH2NHCO—R21, Y represents an alkylene group having 1 to 10 carbon atom(s), R18 and R19 are the same or different, and represent a hydrogen atom or a hydrocarbon group having 1 to 30 carbon atom(s), R20 and R21 represent a hydrocarbon group having 1 to 30 carbon atom(s), or a group having at least one carboxyl group or sulfonyl group or a salt thereof, AOs are the same or different, and represent an oxyalkylene group having 2 to 18 carbon atoms, "s"s are the same or different, and represent an average molar number of addition of an oxyalkylene group, and is 1 to 300, t is 1 to 300 and, regarding the total molar number of addition of the oxyethylene group in the oxyalkylene group as u and a total molar number of addition of an oxyalkylene group having 3 or more carbon atoms to be v, a relationship of $0.1<u/(u+v)<0.9$, $1<u+v<300$ is satisfied.

* * * * *